(12) United States Patent
Buege et al.

(10) Patent No.: US 11,897,121 B2
(45) Date of Patent: Feb. 13, 2024

(54) ELECTRIC GRASPING APPARATUS FOR REFUSE VEHICLE

(71) Applicant: Oshkosh Corporation, Oshkosh, WI (US)

(72) Inventors: Wallace Buege, Oshkosh, WI (US); Martin Schimke, Oshkosh, WI (US); Joshua D. Rocholl, Rochester, MN (US); Jerrod Kappers, Oshkosh, WI (US); Andrew Kotloski, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/885,311

(22) Filed: Aug. 10, 2022

(65) Prior Publication Data

US 2022/0380123 A1 Dec. 1, 2022

Related U.S. Application Data

(63) Continuation of application No. 16/851,162, filed on Apr. 17, 2020, now Pat. No. 11,447,334.

(Continued)

(51) Int. Cl.
*B25J 15/02* (2006.01)
*B25J 9/10* (2006.01)
(Continued)

(52) U.S. Cl.
CPC .......... *B25J 15/0213* (2013.01); *B25J 9/105* (2013.01); *B65F 3/048* (2013.01); *B65F 2003/023* (2013.01); *B65F 2003/025* (2013.01)

(58) Field of Classification Search
CPC ... B25J 9/102; B25J 9/105; B25J 9/126; B25J 15/0213; B65F 2003/023
See application file for complete search history.

(56) References Cited

U.S. PATENT DOCUMENTS

| 1,151,479 A | 8/1915 | Kurtz |
| 2,263,199 A | 11/1941 | Co |

(Continued)

FOREIGN PATENT DOCUMENTS

| CA | 1264702 | 1/1990 |
| CA | 2121055 | 10/1995 |

(Continued)

OTHER PUBLICATIONS

Boivin Evolution Products, https://en.bev.ca/produits, Retrieved on Aug. 31, 2020, 3 pages.

(Continued)

*Primary Examiner* — James Keenan
(74) *Attorney, Agent, or Firm* — Foley & Lardner LLP

(57) ABSTRACT

A refuse vehicle includes a chassis, multiple tractive elements, a reach assembly, and a lift assembly. The multiple tractive elements are coupled with the chassis and configured to support the refuse vehicle. The reach assembly is coupled with the refuse vehicle. The lift assembly is coupled with the reach assembly. The lift assembly includes a track and a fully-electric grabber assembly. The track includes a straight portion and a curved portion. The fully-electric grabber assembly can ascend or descend the track and includes a carriage, a first grabber arm, a second grabber arm, and an electric motor. The carriage is configured to movably couple with the track. The first grabber arm and the second grabber arm are pivotally coupled with the carriage at opposite ends of the carriage. The electric motor is configured to drive the first grabber arm and the second grabber arm to rotate relative to the carriage.

17 Claims, 15 Drawing Sheets

Related U.S. Application Data

(60) Provisional application No. 62/843,291, filed on May 3, 2019.

(51) Int. Cl.
  *B65F 3/04* (2006.01)
  *B65F 3/02* (2006.01)

(56) References Cited

U.S. PATENT DOCUMENTS

| | | | |
|---|---|---|---|
| 3,195,744 A | 7/1965 | Wender | |
| 4,051,970 A | 10/1977 | Ramsey | |
| 4,219,298 A | 8/1980 | Stragier et al. | |
| 4,313,707 A | 2/1982 | Bingman et al. | |
| 4,401,407 A | 8/1983 | Breckenridge | |
| 4,461,608 A | 7/1984 | Boda | |
| 4,606,695 A | 8/1986 | Lenz | |
| 5,015,022 A | 5/1991 | McGuire | |
| 5,158,340 A | 10/1992 | Boda | |
| 5,391,039 A | 2/1995 | Holtom | |
| 5,421,689 A | 6/1995 | Boivin | |
| 5,498,067 A | 3/1996 | Christenson | |
| 5,505,576 A | 4/1996 | Sizemore et al. | |
| 5,527,098 A | 6/1996 | McKinney et al. | |
| 5,702,225 A | 12/1997 | Ghibaudo | |
| 5,720,589 A | 2/1998 | Christenson et al. | |
| 5,785,487 A | 7/1998 | McNeilus et al. | |
| 5,816,766 A | 10/1998 | Clark | |
| 5,833,428 A | 11/1998 | Szinte | |
| 5,919,027 A | 7/1999 | Christenson | |
| 5,934,858 A | 8/1999 | Christenson | |
| 5,934,867 A | 8/1999 | Christenson | |
| 5,938,394 A | 8/1999 | Christenson | |
| 5,951,235 A | 9/1999 | Young et al. | |
| 5,967,731 A | 10/1999 | Brandt | |
| 5,971,694 A | 10/1999 | McNeilus et al. | |
| 5,984,609 A | 11/1999 | Bartlett | |
| 5,988,970 A | 11/1999 | Holtom | |
| 5,988,972 A | 11/1999 | Boivin | |
| 6,033,176 A | 3/2000 | Bartlett | |
| 6,062,803 A | 5/2000 | Christenson | |
| 6,071,058 A | 6/2000 | Tetz et al. | |
| 6,089,813 A | 7/2000 | McNeilus et al. | |
| 6,095,744 A | 8/2000 | Harrison | |
| 6,120,235 A | 9/2000 | Humphries et al. | |
| 6,123,500 A | 9/2000 | McNeilus et al. | |
| 6,135,536 A | 10/2000 | Ciavaglia et al. | |
| 6,210,094 B1 | 4/2001 | McNeilus et al. | |
| 6,213,706 B1 | 4/2001 | Christenson | |
| 6,224,318 B1 | 5/2001 | McNeilus et al. | |
| 6,315,515 B1 | 11/2001 | Young et al. | |
| 6,336,783 B1 | 1/2002 | Young et al. | |
| 6,350,098 B1 | 2/2002 | Christenson et al. | |
| 6,390,758 B1 | 5/2002 | McNeilus et al. | |
| 6,447,239 B2 | 9/2002 | Young et al. | |
| 6,474,928 B1 | 11/2002 | Christenson | |
| 6,485,079 B1 | 11/2002 | Brown et al. | |
| 6,491,489 B1 | 12/2002 | Stragier | |
| 6,494,665 B1 | 12/2002 | Bingman | |
| 6,520,008 B1 | 2/2003 | Stragier | |
| 6,565,305 B2 | 5/2003 | Schrafel | |
| 6,894,447 B1 | 5/2005 | Friede et al. | |
| 7,070,382 B2 | 7/2006 | Pruteanu et al. | |
| 7,073,620 B2 | 7/2006 | Braun et al. | |
| 7,198,130 B2 | 4/2007 | Schimke | |
| 7,258,194 B2 | 8/2007 | Braun et al. | |
| 7,284,943 B2 | 10/2007 | Pruteanu et al. | |
| 7,357,203 B2 | 4/2008 | Morrow et al. | |
| 7,448,460 B2 | 11/2008 | Morrow et al. | |
| 7,556,468 B2 | 7/2009 | Grata | |
| 7,559,735 B2 | 7/2009 | Pruteanu et al. | |
| 7,824,293 B2 | 11/2010 | Schimke | |
| 7,878,750 B2 | 2/2011 | Zhou et al. | |
| 7,931,103 B2 | 4/2011 | Morrow et al. | |
| 8,104,120 B2 | 1/2012 | Hornbach et al. | |
| 8,123,645 B2 | 2/2012 | Schimke | |
| 8,182,194 B2 | 5/2012 | Pruteanu et al. | |
| 8,215,892 B2 | 7/2012 | Calliari | |
| 8,251,420 B2 | 8/2012 | Mizuno et al. | |
| 8,337,352 B2 | 12/2012 | Morrow et al. | |
| 8,360,706 B2 | 1/2013 | Addleman et al. | |
| 8,540,475 B2 | 9/2013 | Kuriakose et al. | |
| 8,561,735 B2 | 10/2013 | Morrow et al. | |
| 8,807,613 B2 | 8/2014 | Howell et al. | |
| 8,864,613 B2 | 10/2014 | Morrow et al. | |
| 9,174,686 B1 | 11/2015 | Messina et al. | |
| 9,216,856 B2 | 12/2015 | Howell et al. | |
| 9,387,985 B2 | 7/2016 | Gillmore et al. | |
| 9,403,641 B1 | 8/2016 | Ghibaudo | |
| 9,428,042 B2 | 8/2016 | Morrow et al. | |
| 9,624,033 B1 * | 4/2017 | Price | B65F 3/04 |
| 9,650,032 B2 | 5/2017 | Kotloski et al. | |
| 9,651,120 B2 | 5/2017 | Morrow et al. | |
| 9,656,659 B2 | 5/2017 | Shukla et al. | |
| 9,707,869 B1 | 7/2017 | Messina et al. | |
| 9,834,377 B1 | 12/2017 | Hayes et al. | |
| 9,880,581 B2 | 1/2018 | Kuriakose et al. | |
| 9,908,520 B2 | 3/2018 | Shukla et al. | |
| 9,970,515 B2 | 5/2018 | Morrow et al. | |
| 9,981,803 B2 | 5/2018 | Davis et al. | |
| 10,029,555 B2 | 7/2018 | Kotloski et al. | |
| 10,029,556 B2 | 7/2018 | Morrow et al. | |
| 10,160,438 B2 | 12/2018 | Shukla et al. | |
| 10,174,868 B2 | 1/2019 | Ditty et al. | |
| 10,196,205 B2 | 2/2019 | Betz et al. | |
| 10,267,390 B2 | 4/2019 | Morrow et al. | |
| 10,301,111 B2 | 5/2019 | Schell | |
| 10,308,429 B2 * | 6/2019 | McNeilus | B65F 3/08 |
| 10,357,995 B2 | 7/2019 | Palmer et al. | |
| 10,414,067 B2 | 9/2019 | Datema et al. | |
| 10,421,350 B2 | 9/2019 | Morrow et al. | |
| 10,435,026 B2 | 10/2019 | Shively et al. | |
| 10,457,134 B2 | 10/2019 | Morrow et al. | |
| 10,457,533 B2 | 10/2019 | Puszkiewicz et al. | |
| 10,558,234 B2 | 2/2020 | Kuriakose et al. | |
| 10,569,423 B1 * | 2/2020 | Jones | B25J 15/0213 |
| 10,578,195 B2 | 3/2020 | Steinberger et al. | |
| 10,584,775 B2 | 3/2020 | Steinberger et al. | |
| 10,661,986 B2 | 5/2020 | Price et al. | |
| 10,703,356 B2 | 7/2020 | Lacroix et al. | |
| 10,801,243 B2 | 10/2020 | Nakatomi et al. | |
| 10,865,827 B2 | 12/2020 | Gentry et al. | |
| 11,001,440 B2 | 5/2021 | Rocholl et al. | |
| 11,254,500 B2 | 2/2022 | Buege et al. | |
| 11,505,404 B2 | 11/2022 | Rocholl et al. | |
| 2002/0154973 A1 | 10/2002 | Bradshaw et al. | |
| 2004/0177934 A1 | 9/2004 | Olmsted | |
| 2006/0280582 A1 | 12/2006 | Kouri | |
| 2011/0240777 A1 | 10/2011 | Johns et al. | |
| 2012/0261931 A1 | 10/2012 | Kang | |
| 2014/0269145 A1 | 9/2014 | Fasana et al. | |
| 2015/0151433 A1 | 6/2015 | Rust et al. | |
| 2016/0044285 A1 | 2/2016 | Gasca et al. | |
| 2017/0044815 A1 | 2/2017 | Watanabe | |
| 2018/0155124 A1 | 6/2018 | Kay et al. | |
| 2018/0250847 A1 | 9/2018 | Wurtz et al. | |
| 2018/0326832 A1 | 11/2018 | Kotloski et al. | |
| 2019/0091890 A1 | 3/2019 | Rocholl et al. | |
| 2019/0111910 A1 | 4/2019 | Shukla et al. | |
| 2019/0121353 A1 | 4/2019 | Datema et al. | |
| 2019/0161272 A1 | 5/2019 | Betz et al. | |
| 2019/0193934 A1 | 6/2019 | Rocholl et al. | |
| 2019/0242460 A1 | 8/2019 | Morrow et al. | |
| 2019/0322321 A1 | 10/2019 | Schwartz et al. | |
| 2019/0325220 A1 | 10/2019 | Wildgrube et al. | |
| 2019/0344475 A1 | 11/2019 | Datema et al. | |
| 2019/0360600 A1 | 11/2019 | Jax et al. | |
| 2019/0366828 A1 | 12/2019 | Morrow et al. | |
| 2020/0031641 A1 | 1/2020 | Puszkiewicz et al. | |
| 2020/0039341 A1 | 2/2020 | Morrow et al. | |
| 2020/0078986 A1 | 3/2020 | Clifton et al. | |
| 2020/0102145 A1 | 4/2020 | Nelson et al. | |
| 2020/0180860 A1 | 6/2020 | Searle et al. | |
| 2020/0200237 A1 | 6/2020 | Steinberger et al. | |

(56) References Cited

U.S. PATENT DOCUMENTS

| | | |
|---|---|---|
| 2020/0200238 A1 | 6/2020 | Steinberger et al. |
| 2020/0230841 A1 | 7/2020 | Datema et al. |
| 2020/0230842 A1 | 7/2020 | Datema et al. |
| 2020/0262328 A1 | 8/2020 | Nelson et al. |
| 2020/0262366 A1 | 8/2020 | Wildgrube et al. |
| 2020/0265656 A1 | 8/2020 | Koga et al. |
| 2021/0039880 A1 | 2/2021 | Boivin et al. |
| 2021/0122568 A1 | 4/2021 | Boivin et al. |

FOREIGN PATENT DOCUMENTS

| | | | | |
|---|---|---|---|---|
| CA | 2373724 | | 8/2003 | |
| CA | 3072106 | | 2/2019 | |
| CN | 105210518 A | * | 1/2016 | |
| CN | 105501766 B | | 3/2018 | |
| CN | 107985873 A | | 5/2018 | |
| DE | 10 2006 032 206 A1 | | 1/2008 | |
| DE | 10 2007 026 418 A1 | | 12/2008 | |
| DE | 102008013940 A1 | * | 9/2009 | ............. B65F 3/041 |
| EP | 0 620 167 | | 10/1994 | |
| GB | 2129086 A | * | 5/1984 | ........... B23Q 1/5481 |
| GB | 2 405 395 A | | 3/2005 | |
| JP | H11168925 A | * | 6/1999 | |
| JP | 2016-068200 A | | 5/2016 | |
| WO | WO-2019/033201 A1 | | 2/2019 | |
| WO | WO-2021/068063 A1 | | 4/2021 | |

OTHER PUBLICATIONS

Boivin Evolution, Introducing the First 100% Electric Automated Arm and Collection Body, URL: https://28d16714-b3dd-403e-a844-10d42b38b19e.filesusr.com/ugd/6b1a10_9255a4d94f054fd48e688e6fe30c6874.pdf, printed on Aug. 31, 2020, 2 pages.

* cited by examiner

ELECTRIC GRASPING APPARATUS FOR REFUSE VEHICLE

CROSS-REFERENCE TO RELATED PATENT APPLICATION

This application is a continuation of U.S. application Ser. No. 16/851,162, filed Apr. 17, 2020, which claims the benefit of and priority to U.S. Provisional Patent Application No. 62/843,291, filed May 3, 2019, the entire disclosures of which are incorporated by reference herein.

BACKGROUND

The present disclosure generally relates to the field of refuse vehicles, and in particular, to a grabber assembly for a refuse vehicle.

SUMMARY

One implementation of the present disclosure is a refuse vehicle, according to an exemplary embodiment. The refuse vehicle includes a chassis, multiple tractive elements, a reach assembly, and a lift assembly. The multiple tractive elements are coupled with the chassis and configured to support the refuse vehicle. The reach assembly is coupled with the refuse vehicle. The lift assembly is coupled with the reach assembly. The lift assembly includes a track and a fully-electric grabber assembly. The track includes a straight portion and a curved portion. The fully-electric grabber assembly is configured to ascend or descend the track and includes a carriage, a first grabber arm, a second grabber arm, and an electric motor. The carriage is configured to movably couple with the track. The first grabber arm and the second grabber arm are pivotally coupled with the carriage at opposite ends of the carriage. The electric motor is configured to drive the first grabber arm and the second grabber arm to rotate relative to the carriage.

Another implementation of the present disclosure is a fully-electric grabber assembly for a refuse vehicle, according to an exemplary embodiment. The fully-electric grabber assembly includes a carriage, a first grabber arm, a second grabber, arm, an electric climb system, and an electric gripping system. The carriage is configured to movably couple with a track of the refuse vehicle. The first grabber arm is pivotally coupled with the carriage at a first end of the carriage. The second grabber arm is pivotally coupled with the carriage at a second end of the carriage. The electric climb system includes an electric climb motor configured to drive a pinion. The pinion is configured to engage the track of the refuse vehicle to move the fully-electric grabber assembly along the track. The electric gripping system includes a first shaft, a second shaft, and an electric gripping motor. The first shaft includes a first worm configured to engage a first worm gear that is rotatably fixedly coupled with the first grabber arm. The second shaft is rotatably fixedly coupled with the first shaft. The second shaft includes a second worm configured to engage a second worm gear that is rotatably fixedly coupled with the second grabber arm. The electric gripping motor is configured to drive the first shaft and the second shaft to rotate the first grabber arm and the second grabber arm.

Another implementation of the present disclosure is a fully-electric grabber assembly, according to an exemplary embodiment. The fully-electric grabber assembly includes a carriage, a grabber arm, an electric motor, a first gear, an intermediate gear, and an arm gear. The carriage is configured to movably couple with the track. The grabber arm is pivotally coupled at an end of the carriage. The electric motor is configured to drive an output driveshaft. The first gear is rotatably coupled with the carriage and translationally fixedly coupled with the carriage at an axis radially offset from a center of the first gear. The first gear is configured to be driven by the output driveshaft to rotate about the axis. The intermediate gear is configured to be driven by the first gear. The intermediate gear is rotatably coupled with the first gear through a rotatable linkage that extends between the center of the first gear and the center of the intermediate gear. The arm gear is fixedly coupled with the grabber arm and configured to be driven by the intermediate gear to pivot the grabber arm.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
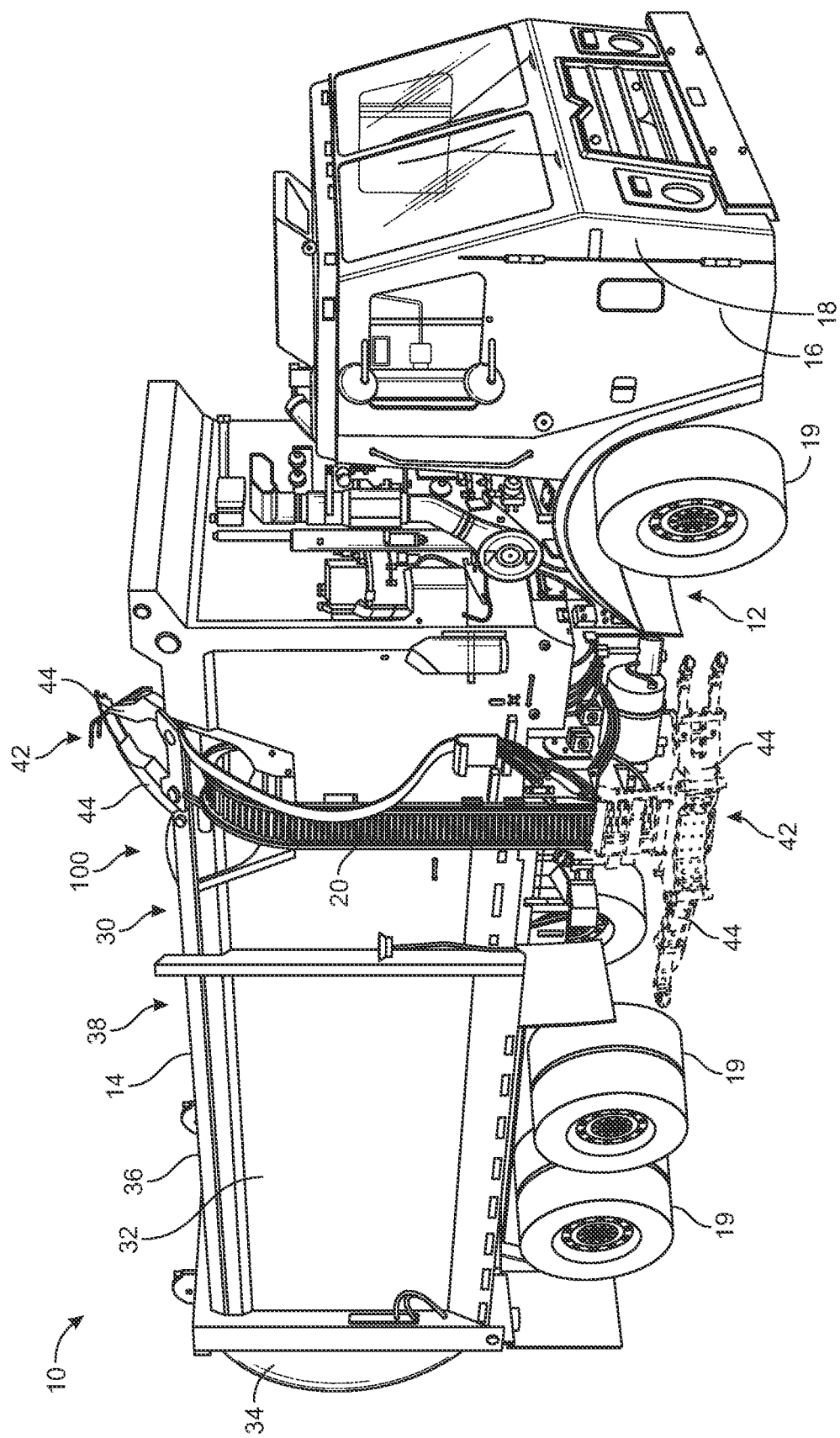
FIG. 1 is a perspective view of a refuse vehicle, shown to include a loading assembly, a track, and a grabber assembly, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, a fully-electrically actuated grabber can include a carriage and grabber arms pivotally or rotatably coupled at opposite ends of the carriage. The carriage can be configured to translate along a track of a refuse vehicle. In other embodiments, the carriage is fixedly or removably coupled with an articulated arm, a telescoping arm, a boom, etc., of the refuse vehicle. The fully-electrically actuated grabber can also be implemented in a variety of systems or devices other than a refuse vehicle, including, for example, a telehandler, a boom lift, a front loading refuse vehicle, a rear loading refuse vehicle, a side loading refuse vehicle, etc.

The fully-electrically actuated grabber can use a variety of electrically activated systems. For example, the fully-electrically actuated grabber can include any number of motors, electric linear actuators, etc. The fully-electrically actuated grabber can include a fully electric rack and pinion system that uses an electric motor to produce side-to-side translation of rack members. The rack members can include teeth that mesh with gearing systems to pivot/rotate the grabber arms as the rack members translate. In other embodiments, an electric motor directly drives a gearing system configured to pivot/rotate one or both of the grabber arms. The gearing system may include any number of gears, a gear train, etc. In some embodiments, the gearing system is an eccentric gearing system.

In other embodiments, electric linear actuators are used to pivot/rotate each of the grabber arms. The electric linear actuators can be pivotally coupled at one end with the carriage, and at a distal end with one of the grabber arms. Extension/expansion and retraction/compression of the electric linear actuators can independently pivot/rotate each of the grabber arms. The fully-electrically actuated grabber can also use an eccentric gearing system. Various embodiments described herein are configured to independently drive the grabber arms to swing or pivot, while other embodiments drive the grabber arms to swing or pivot concurrently through a unified system (e.g., a system that drives the grabber arms to swing or pivot simultaneously). s According to the exemplary embodiment shown in FIG. 1, a vehicle, shown as refuse vehicle 10 (e.g., a garbage truck, a waste collection truck, a sanitation truck, a refuse collection truck, a refuse collection vehicle, etc.), is configured as a side-loading refuse truck having a first lift mechanism/system (e.g., a side-loading lift assembly, etc.), shown as lift assembly 100. In other embodiments, refuse vehicle 10 is configured as a front-loading refuse truck or a rear-loading refuse truck. In still other embodiments, the vehicle is another type of vehicle (e.g., a skid-loader, a telehandler, a plow truck, a boom lift, etc.).

As shown in FIG. 1, refuse vehicle 10 includes a chassis, shown as frame 12; a body assembly, shown as body 14, coupled to frame 12 (e.g., at a rear end thereof, etc.); and a cab, shown as cab 16, coupled to frame 12 (e.g., at a front end thereof, etc.). Cab 16 may include various components to facilitate operation of refuse vehicle 10 by an operator (e.g., a seat, a steering wheel, hydraulic controls, a user interface, switches, buttons, dials, etc.). As shown in FIG. 1, refuse vehicle 10 includes a prime mover, shown as engine 18, coupled to frame 12 at a position beneath cab 16. Engine 18 is configured to provide power to a plurality of tractive elements, shown as wheels 19, and/or to other systems of refuse vehicle 10 (e.g., a pneumatic system, a hydraulic system, an electric system, etc.). Engine 18 may be configured to utilize one or more of a variety of fuels (e.g., gasoline, diesel, bio-diesel, ethanol, natural gas, etc.), according to various exemplary embodiments. According to an alternative embodiment, engine 18 additionally or alternatively includes one or more electric motors coupled to frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of refuse vehicle 10.

According to an exemplary embodiment, refuse vehicle 10 is configured to transport refuse from various waste receptacles within a municipality to a storage and/or processing facility (e.g., a landfill, an incineration facility, a recycling facility, etc.). As shown in FIG. 1, body 14 includes a plurality of panels, shown as panels 32, a tailgate 34, and a cover 36. Panels 32, tailgate 34, and cover 36 define a collection chamber (e.g., hopper, etc.), shown as refuse compartment 30. Loose refuse may be placed into refuse compartment 30 where it may thereafter be compacted. Refuse compartment 30 may provide temporary storage for refuse during transport to a waste disposal site and/or a recycling facility. In some embodiments, at least a portion of body 14 and refuse compartment 30 extend in front of cab 16. According to the embodiment shown in FIG. 1, body 14 and refuse compartment 30 are positioned behind cab 16. In some embodiments, refuse compartment 30 includes a hopper volume and a storage volume. Refuse may be initially loaded into the hopper volume and thereafter compacted into the storage volume. According to an exemplary embodiment, the hopper volume is positioned between the storage volume and cab 16 (i.e., refuse is loaded into a position of refuse compartment 30 behind cab 16 and stored in a position further toward the rear of refuse compartment 30). In other embodiments, the storage volume is positioned between the hopper volume and cab 16 (e.g., a rear-loading refuse vehicle, etc.).

As shown in FIG. 1, refuse vehicle 10 includes first lift mechanism/system (e.g., a front-loading lift assembly, etc.), shown as lift assembly 100. Lift assembly 100 includes a grabber assembly, shown as grabber assembly 42, movably coupled to a track, shown as track 20, and configured to move along an entire length of track 20. According to the exemplary embodiment shown in FIG. 1, track 20 extends along substantially an entire height of body 14 and is configured to cause grabber assembly 42 to tilt near an upper height of body 14. In other embodiments, track 20 extends along substantially an entire height of body 14 on a rear side of body 14. Refuse vehicle 10 can also include a reach system or assembly coupled with a body or frame of refuse vehicle 10 and lift assembly 100. The reach system can include telescoping members, a scissors stack, etc., or any other configuration that can extend or retract to provide additional reach of grabber assembly 42 for refuse collection.

Figure 3:
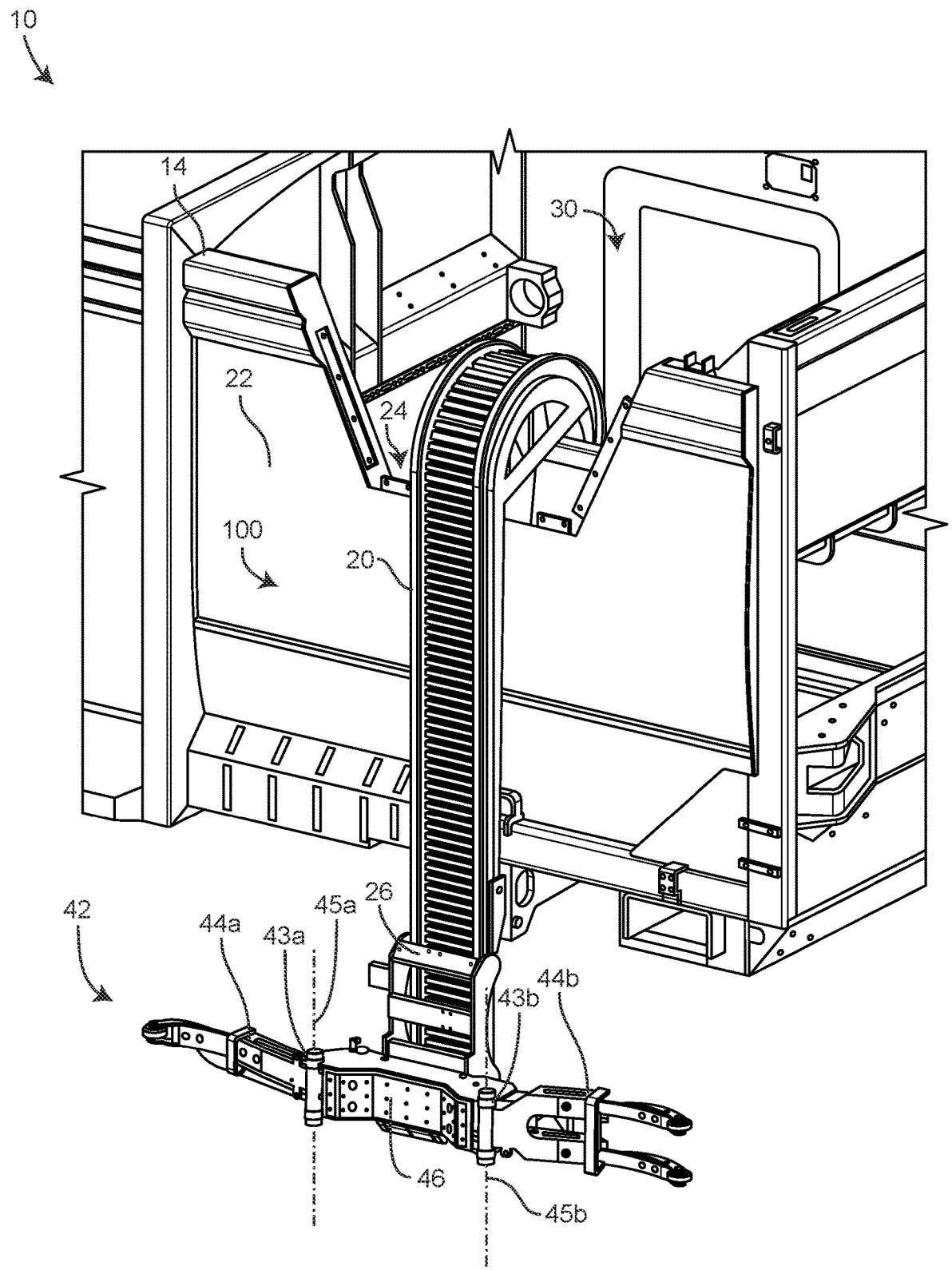
FIG. 3 is a perspective view of the loading assembly of the refuse vehicle of FIG. 1, shown to include the grabber assembly of FIG. 1, according to an exemplary embodiment.

Referring still to FIG. 1, grabber assembly 42 includes a pair of grabber arms shown as grabber arms 44. Grabber arms 44 are configured to rotate about an axis extending through a bushing. Grabber arms 44 are configured to releasably secure a refuse container to grabber assembly 42, according to an exemplary embodiment. Grabber arms 44 rotate about the axis extending through the bushing to transition between an engaged state (e.g., a fully grasped configuration, a fully grasped state, a partially grasped configuration, a partially grasped state) and a disengaged state (e.g., a fully open state/configuration, a fully released state/configuration, a partially open state/configuration, a partially released state/configuration). In the engaged state, grabber arms 44 are rotated towards each other such that the refuse container is grasped therebetween. In the disengaged state, grabber arms 44 rotate outwards (as shown in FIG. 3) such that the refuse container is not grasped therebetween. By transitioning between the engaged state and the disengaged state, grabber assembly 42 releasably couples the refuse container with grabber assembly 42. Refuse vehicle 10 may pull up along-side the refuse container, such that the refuse container is positioned to be grasped by the grabber assembly 42 therebetween. Grabber assembly 42 may then transition into an engaged state to grasp the refuse container. After the refuse container has been securely grasped, grabber assembly 42 may be transported along track 20 with the refuse container. When grabber assembly 42 reaches the end of track 20, grabber assembly 42 may tilt and empty the contents of the refuse container in refuse compartment 30. The tilting is facilitated by the path of track 20. When the contents of the refuse container have been emptied into refuse compartment 30, grabber assembly 42 may descend along track 20, and return the refuse container to the ground. Once the refuse container has been placed on the ground, the grabber assembly may transition into the disengaged state, releasing the refuse container.

Figure 2:
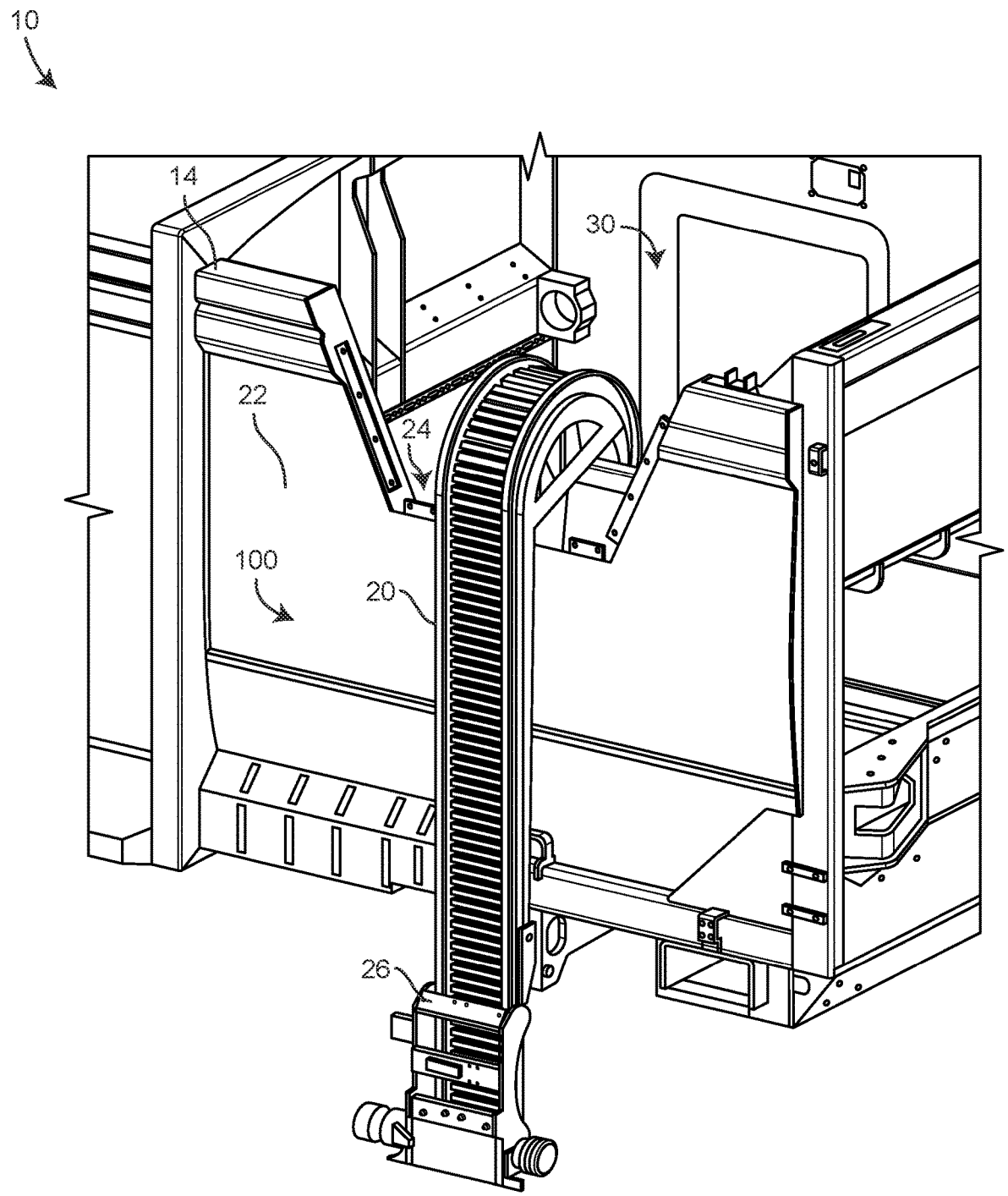
FIG. 2 is a perspective view of the loading assembly of the refuse vehicle of FIG. 1, according to an exemplary embodiment.

Referring now to FIGS. 2-3, the lift assembly 100 is shown in greater detail, according to an exemplary embodiment. Lift assembly 100 is shown to include track 20, and a coupling member, shown as connecting member 26. Track 20 is configured to extend along substantially the entire height of body 14, according to the exemplary embodiment shown. Body 14 is shown to include a loading section, shown as loading section 22. Loading section 22 is shown to include a recessed portion, shown as recessed portion 24. Recessed portion 24 is configured to allow track 20 to curve through recessed portion 24, such that track 20 may be configured to empty a refuse bin (e.g., a garbage can) releasably couple to grabber assembly 42 in refuse compartment 30.

Still referring to FIGS. 2-3, connecting member 26 is shown coupled with track 20. Connecting member 26 is coupled to track 20 such that connecting member 26 may move along an entire path length of track 20. Connecting member 26 may removably couple with grabber assembly 42, thereby removably coupling grabber assembly 42 to track 20, and allowing grabber assembly 42 to travel along the entire path length of track 20. Connecting member 26 removably couples (e.g., by removable fasteners) to a carriage portion of grabber assembly 42, shown as carriage 46. Grabber assembly 42 is shown to include grabber arms, shown as first grabber arm 44a and second grabber arm 44b, according to an exemplary embodiment. First grabber arm 44a and second grabber arm 44b are each configured to pivot about axis 45a and axis 45b, respectively. Axis 45a is defined as an axis longitudinally extending through substantially an entire length of a first adapter or bushing assembly, shown as first adapter assembly 43a, and axis 45b is defined as an axis longitudinally extending through substantially an entire length of a second adapter or bushing assembly, shown as second adapter assembly 43a. First adapter assembly 43a fixedly couples to a first end of carriage 46, and rotatably couples to first grabber arm 44a. Second adapter assembly 43b fixedly couples to a second end of carriage 46, and rotatably couples to second grabber arm 44b. First adapter assembly 43a and second adapter assembly 43b couple first grabber arm 44a and second grabber arm 44b to carriage 46, and allow first grabber arm 44a and second grabber arm 44b to rotate about axis 45a and axis 45b, respectively.

Figure 4:
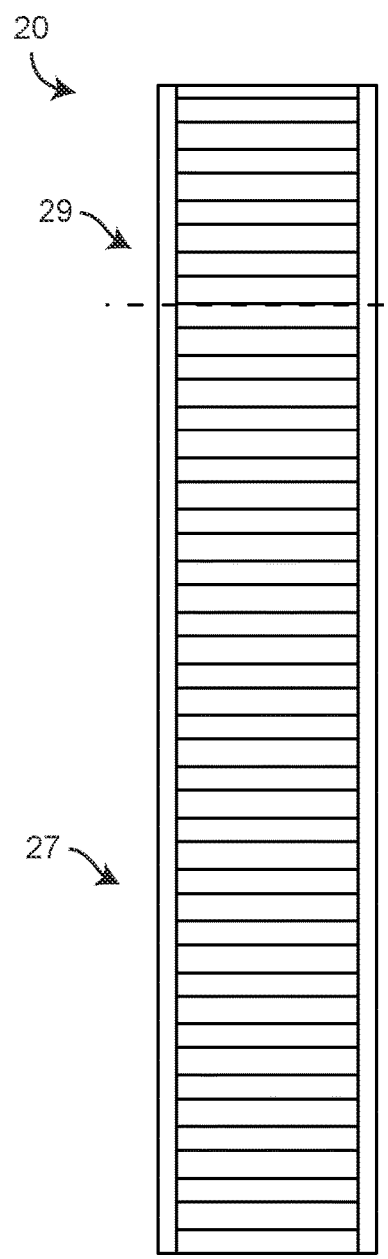
FIG. 4 is a front view of the track of FIG. 1, according to an exemplary embodiment.
Figure 5:
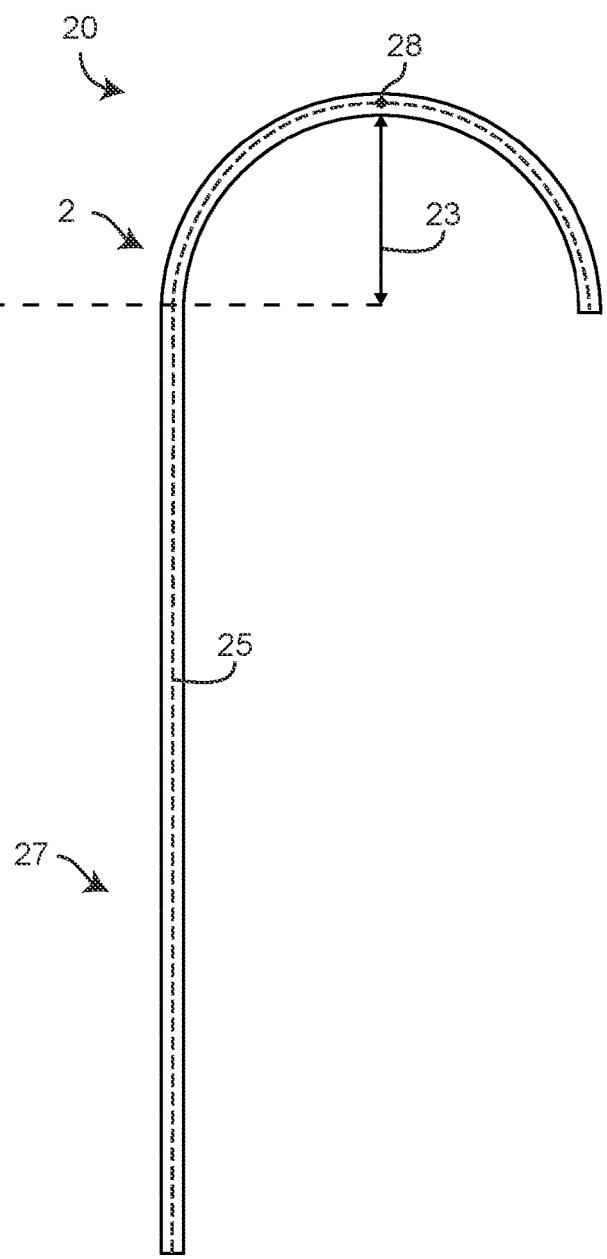
FIG. 5 is a side view of the track of FIG. 1, according to an exemplary embodiment.

Referring now to FIGS. 4-5, the track 20 is shown in greater detail according to an exemplary embodiment. FIG. 4 shows a front view of track 20, and FIG. 5 shows a side view of track 20, according to an exemplary embodiment. Track 20 is shown to include a straight portion 27, and a curved portion 29. Straight portion 27 may be substantially vertical, and/or substantially parallel to loading section 22 of body 14, according to an exemplary embodiment. Curved portion 29 may have a radius of curvature, shown as radius 23, according to an exemplary embodiment. In some embodiments, curved portion 29 has a constant radius of curvature (i.e., curved portion 29 has a constant radius 23 along all points on a path of curved portion 29), while in other embodiments, curved portion 29 has a non-constant radius of curvature (i.e., curved portion 29 has a non-constant radius 23 along various points on the path of curved portion 29). According to an exemplary embodiment, straight portion 27 has an infinite radius of curvature. According to an exemplary embodiment, grabber assembly 42 may travel along a path of track 20, shown as path 25. Track 20 may be configured to tilt grabber assembly 42 to empty contents of a refuse container when grabber assembly 42 travels along path 25 and travels past a point on path 25, shown as point 28. When grabber assembly 42 travels along path 25 past point 28, grabber assembly 42 may tilt, emptying the contents of the refuse container in refuse compartment 30.

Figure 6:
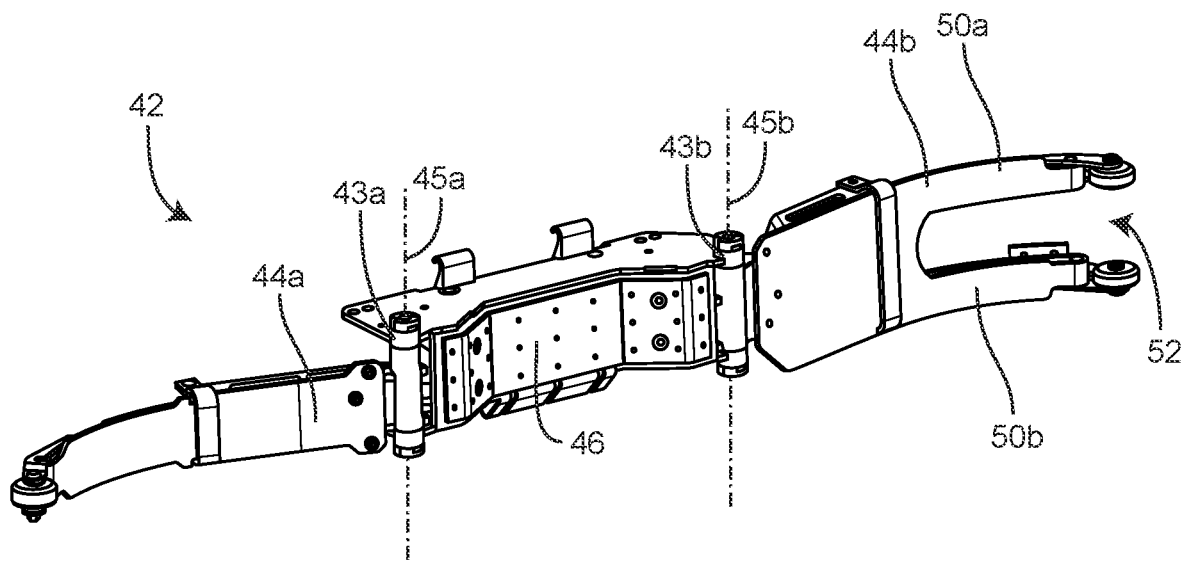
FIG. 6 is a perspective view of the grabber assembly of FIG. 1, shown to include a first grabber arm connector and a second grabber arm connector, according to an exemplary embodiment.
Figure 7:
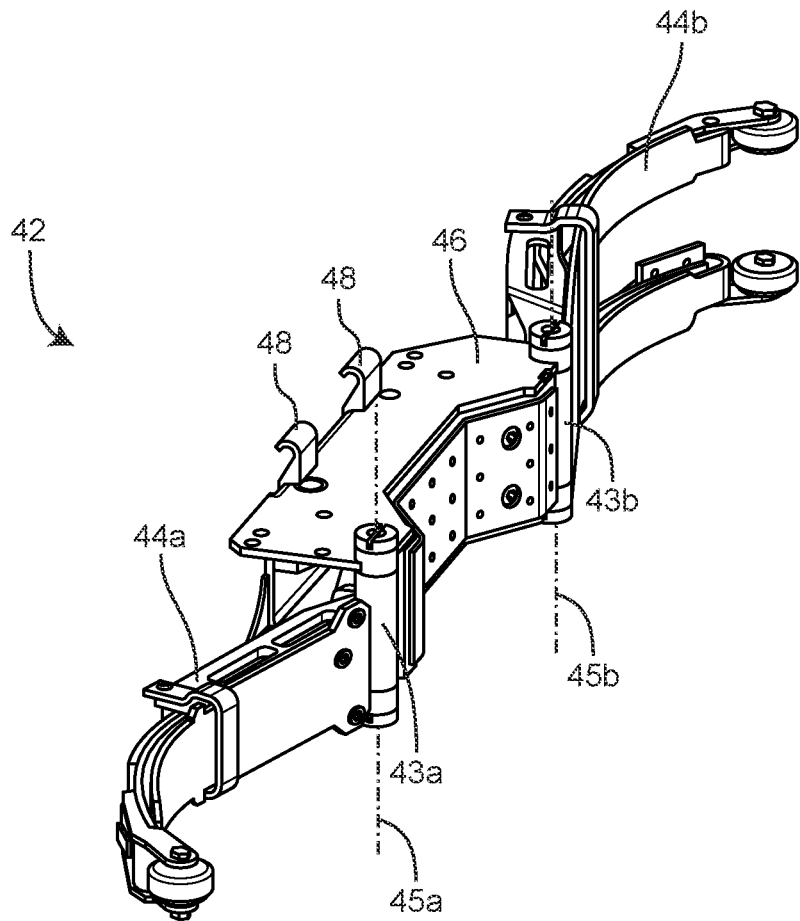
FIG. 7 is a perspective view of the grabber assembly of FIG. 1, shown to include a first grabber arm connector and a second grabber arm connector, according to an exemplary embodiment.

Referring now to FIGS. 6-7, grabber assembly 42 is shown, according to an exemplary embodiment. Grabber assembly 42 includes carriage 46, first adapter assembly 43a fixedly coupled at the first end of carriage 46, second adapter assembly 43a fixedly coupled at the second end of carriage 46, first grabber arm 44a rotatably coupled to first adapter assembly 43a, and second grabber arm 44b rotatably coupled to second adapter assembly 43a. Grabber assembly 42 also includes hooks, shown as hooks 48, according to an exemplary embodiment. Hooks 48 may be integrally formed with carriage 46, according to some embodiments. In some embodiments, hooks 48 are removably coupled to carriage 46 (e.g., with fasteners). Hooks 48 may assist in removably coupling grabber assembly 42 to connecting member 26, according to an exemplary embodiment. Hooks 48 may aid in supporting the weight of grabber assembly 42 when grabber assembly 42 is attached to connecting member 26, according to some embodiments.

Referring still to FIGS. 6-7, carriage 46 is shown to have a profile that is the shape of a portion of a hexagon. In other embodiments, carriage 46 has a curved profile, a straight profile, a rectangular profile, an irregularly shaped profile, etc. The profile of carriage 46 may assist in coupling grabber assembly 42 to a refuse container by interfacing with a curved or correspondingly shaped portion of the refuse container, according to an exemplary embodiment. Referring still to FIGS. 6 and 7, each of first grabber arm 44a, and second grabber arm 44b are shown to include a curved profile, according to an exemplary embodiment. First grabber arm 44a and second grabber arm 44b can have a generally arcuate shape that can facilitate surrounding and grasping refuse collection bins.

Referring still to FIGS. 6-7, grabber assembly 42 is shown to include first grabber arm 44a and second grabber arm 44b, according to an exemplary embodiment. Second grabber arm 44b includes a first protrusion, shown as first grabber finger 50a, and a second protrusion shown as second grabber finger 50b, according to an exemplary embodiment. First grabber finger 50a and second grabber finger 50b define an open space, shown as open space 52. Open space 52 may have a width equal to or greater than a maximum width of first grabber arm 44a, according to some embodiments. In some embodiments, when grabber assembly 42 transitions into an engaged state (e.g., a grasped state, a fully grasped state, etc.), first grabber arm 44a moves into the open space 52, defined by the space between first grabber finger 50a and second grabber finger 50b.

Figure 8:
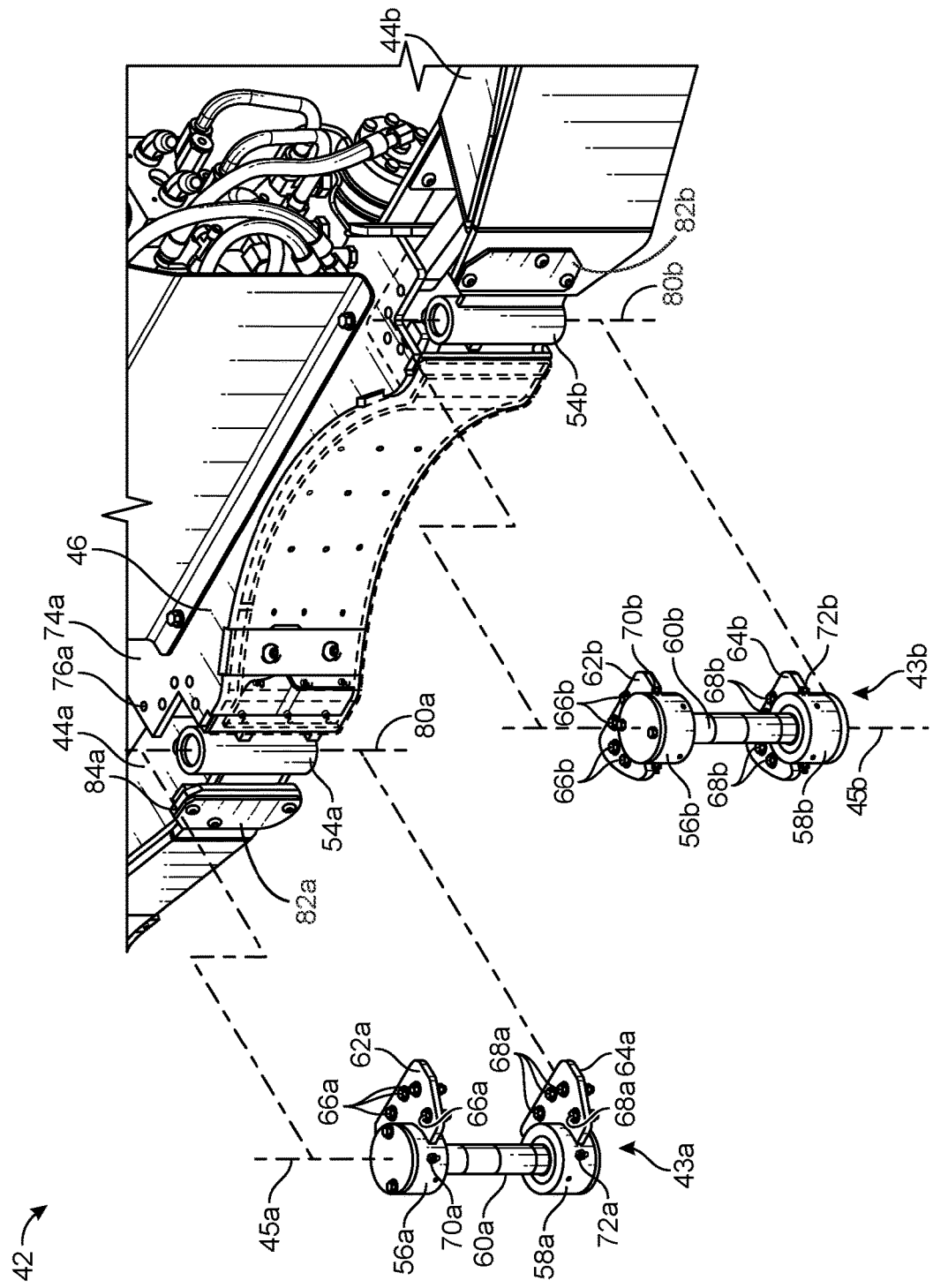
FIG. 8 is an exploded view of the grabber assembly of FIG. 1, according to an exemplary embodiment.

Referring now to FIG. 8, an exploded view of a portion of grabber assembly 42 is shown in greater detail, according to an illustrative embodiment. First adapter assembly 43a and second adapter assembly 43b are symmetrical, such that whatever is said of first adapter assembly 43a may be said of second adapter assembly 43b, and vice versa. First adapter assembly 43a is shown removably disconnected from carriage 46, according to the illustrative embodiment. First adapter assembly 43a includes a top piece, shown as top adapter piece 56a, a bottom piece, shown as bottom adapter piece 58a and a pin, shown as adapter assembly pin 60a. Top adapter piece 56a coupled with a plate, shown as top adapter plate 62a, according to an exemplary embodiment. In some embodiments, top adapter plate 62a is integrally formed with top adapter piece 56a. Top adapter plate 62a is shown to include fasteners 66a, according to an exemplary embodiment. Top adapter plate 62a is configured to couple with a surface, shown as surface 74a of carriage 46, and removably couples to carriage 46 via fasteners 66a and fastener connections 76a. In some embodiments, fasteners 66a include a bolt and a nut, and fastener connections 76a are through holes configured to receive fasteners 66a to removably couple first adapter assembly 43a to carriage 46. First adapter assembly 43a is also shown to include bottom adapter piece 58a, according to an exemplary embodiment. Bottom adapter piece 58a may be constructed similarly to top adapter piece 56a, and includes a bottom plate, shown as bottom adapter plate 64a. Bottom adapter plate 64a includes bottom fasteners, shown as fasteners 68a, and configured to removably couple first adapter assembly 43a to carriage 46. Fasteners 68a are shown to be the same as fasteners 66a, and may be configured couple with a bottom surface of carriage 46, vis a vis fasteners 66a.

Referring still to FIG. 8, first adapter assembly 43a includes adapter assembly pin 60a. Adapter assembly pin 60a is configured to pivotally couple with a bushing, shown as first bushing 54a of first grabber arm 44a, according to an exemplary embodiment. Adapter assembly pin 60a may allow first grabber arm 44a to pivot about axis 45a and support first grabber arm 44a. Adapter assembly pin 60a is configured to extend through an entire longitudinal length of first bushing 54a and extends into top adapter piece 56a at a first end, and into bottom adapter piece 58a at a second end, according to an exemplary embodiment. First adapter assembly 43a is also shown to include a top fastener and a bottom fastener, shown as top pin fastener 70a and bottom pin fastener 72a, according to an exemplary embodiment. Top pin fastener 70a and bottom pin fastener 72a removably couple adapter assembly pin 60a to the top adapter piece 56a and the bottom adapter piece 58a, respectively. In an exemplary embodiment, top pin fastener 70a and bottom pin fastener 72a extend through axis 45a. Axis 45a may be defined as an axis extending longitudinally through a center of adapter assembly pin 60a. Top adapter piece 56a and bottom adapter piece 58a may be axially aligned with adapter assembly pin 60a, such that axis 45a extends through the center of top adapter piece 56a and bottom adapter piece 58a, according to an exemplary embodiment. In some embodiments, each of top pin fastener 70a and bottom pin fastener 72a are bolt fasteners and extend through a top hole and a bottom hole, respectively. The top hole is normal to axis 45a, and radially extends through top adapter piece 56a and the end of adapter assembly pin 60a which extends into top adapter piece 56a, according to an exemplary embodiment. The bottom hole is normal to axis 45a and radially extends through bottom adapter piece 58a and the end of adapter assembly pin 60a which extends into bottom adapter piece 58a, according to an exemplary embodiment.

Referring still to FIG. 8, first grabber arm 44a and second grabber arm 44b are shown to include first bushing 54a and second bushing 54b, according to an exemplary embodiment. First bushing 54a and second bushing 54b are configured to pivotally couple with adapter assembly pin 60a and adapter assembly pin 60b, respectively. Each of first bushing 54a and second bushing 54b include a connecting feature, shown as connecting feature 82a and connecting feature 82b, respectively. First bushing 54a and second bushing 54b may be similarly or symmetrically configured and constructed, such that whatever is said of first bushing 54a may be said of second bushing 54b, and vice versa. First bushing 54a removably couples to first grabber arm 44a through connecting feature 82a, according to an exemplary embodiment. First bushing 54a may include a flanged portion (not shown) which extends behind a plate portion 84a of first grabber arm 44a. Connecting feature 82a may be positioned on an opposite side of plate portion 84a of first grabber arm 44a and may include fasteners configured to removably couple first bushing 54a with plate portion 84a of first grabber arm 44a.

Referring still to FIG. 8, each of first adapter assembly 43a and second adapter assembly 43b are shown removably disconnected from carriage 46. Each of top adapter piece 56a and bottom adapter piece 58a are shown removably coupled to adapter assembly pin 60a. First bushing 54a and second bushing 54b are shown removably coupled to first grabber arm 44a and second grabber arm 44b, respectively. The removable couplings discussed in greater detail above are advantageous since they allow grabber assembly 42 to be quickly and easily disassembled for maintenance purposes. A technician may easily disassemble grabber assembly 42 by first disconnecting top fasteners 66a, bottom fasteners 68a, top fasteners 66b, and bottom fasteners 68b to remove first adapter assembly 43a and second adapter assembly 43b. The technician may further disassemble first adapter assembly 43a and second adapter assembly 43b by disconnecting top pin fastener 70a, bottom pin fastener 72a, top pin fastener 70b, and bottom pin fastener 72b to completely disassemble first adapter assembly 43a and second adapter assembly 43b. Additionally, the technician may disassembly first bushing 54a and second bushing 54b by disconnecting connecting feature 82a and connecting feature 82b from first grabber arm 44a and second grabber arm 44b. This allows the technician to quickly disassemble and replace various components of grabber assembly 42 and may decrease an amount of maintenance time required for the refuse vehicle 10, allowing refuse vehicle 10 to quickly return to service. In some embodiments, the removable couplings described also allow the technician to adjust an alignment of the adapter assembly pin (e.g., adapter assembly pin 60a) within the bushing (e.g., first bushing 54a). For example, if top fasteners 66a and bottom fasteners 68a are bolt fasteners, fastener connections 76a may be through holes, configured to receive fasteners 66a. The diameters of fastener connections 76a may be large enough to allow fasteners 66a to be adjusted within the diameter of fastener connections 76a, to adjust the alignment of adapter assembly pin 60a within bushing 54a. The technician may loosen top fasteners 66a or bottom fasteners 68a and adjust a position of top fasteners 66a or bottom fasteners 68a within fastener connections 76a. Once a desired alignment has been achieved, the technician may tighten top fasteners 66a and/or bottom fasteners 68a to maintain the desired alignment.

In some embodiments, grabber assembly 42 uses polymeric wear surfaces. For example, an inner diameter of first bushing 54a may undergo wear due to the slidable coupling between the inner diameter of first bushing 54a and an outer diameter of adapter assembly pin 60a. In order to provide proper lubrication and/or wear resistance, a polymeric surface may be applied to at least one of the outer diameter of adapter assembly pin 60a and the inner diameter of first bushing 54a, according to an exemplary embodiment. The polymeric wear surface may be any of a surface made of polyethylene, polytetrafluoroethylene, polypropylene, polyisobutylene, polystyrene, polyvinylchloride, polyehterketone, polyoxymethylene, polyimide, etc., or any other polymer. In some embodiments, the polymeric wear surface may be a sleeve removably inserted into the first bushing 54a or over the adapter assembly pin 60a. Advantageously, polymeric wear surfaces reduce the need to periodically grease the wear surfaces of grabber assembly 42. This may result in cost and time savings by providing a greaseless grabber assembly 42.

Figure 9:
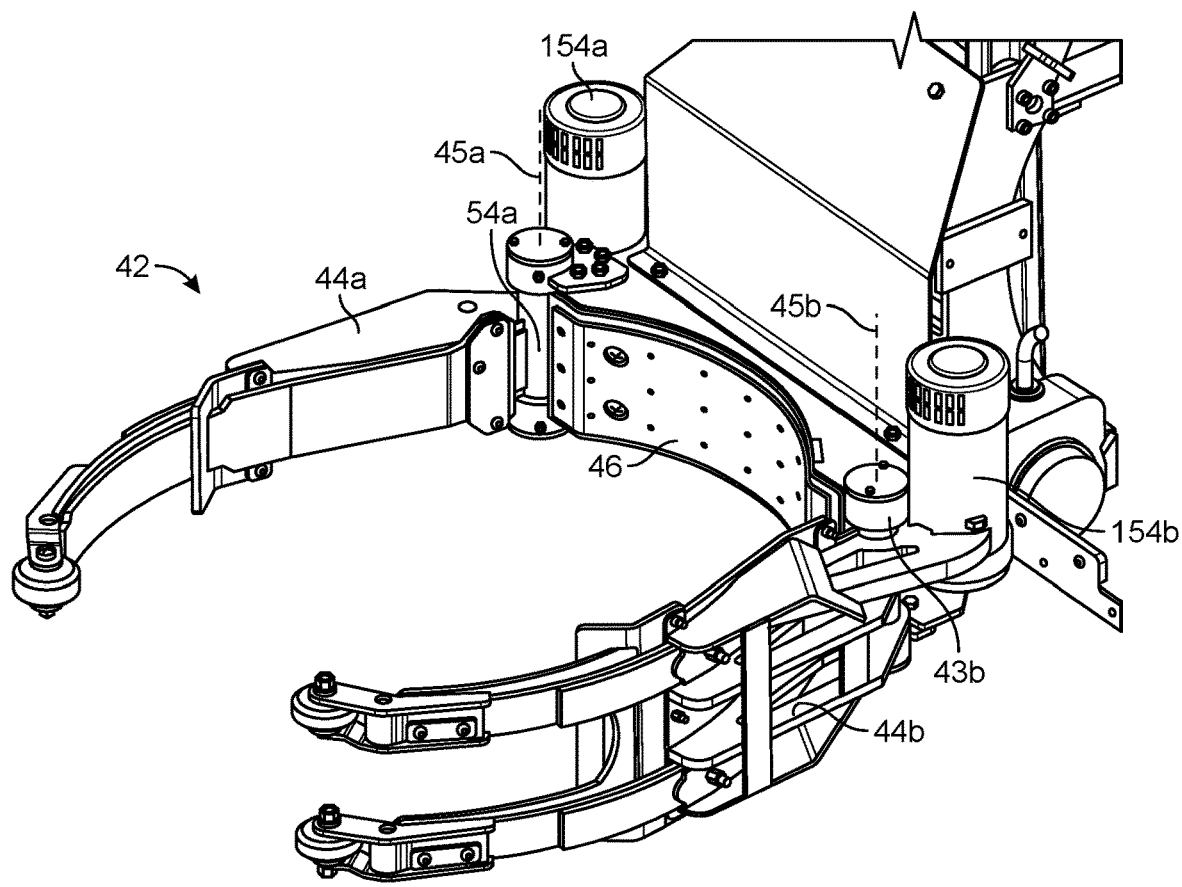
FIG. 9 is a perspective view of the grabber assembly of FIG. 1 configured to be driven to grasp and release refuse containers by electric motors, according to an exemplary embodiment.
Figure 10:
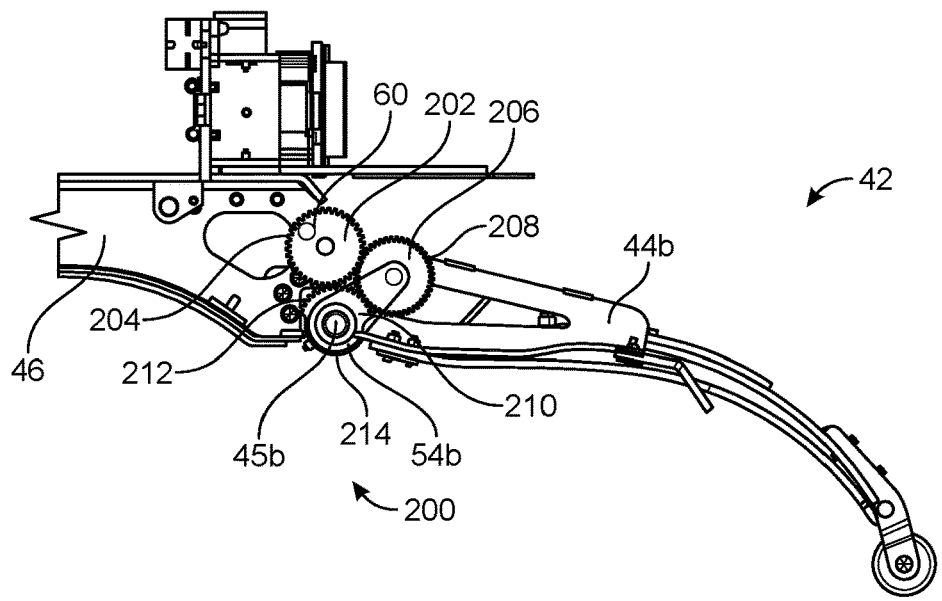
FIG. 10 is a top view of the grabber assembly of FIG. 9 with an eccentric gearing system, according to an exemplary embodiment.

Referring now to FIGS. 9 and 10, first grabber arm 44a and second grabber arm 44b can be driven to grasp (e.g., to pivot or rotate about adapter assemblies 43) by one or more electric motors 154. Specifically, second grabber arm 44b can be driven to rotate inwards or outwards (e.g., as shown in FIG. 8) by electric motor 154b and first grabber arm 44a can be driven to rotate inwards or outwards (e.g., as shown in FIG. 8) by electric motor 154a. First grabber arm 44a can rotate about axis 45a in a clockwise direction to grasp a refuse container and in a counter-clockwise direction about axis 45a to release a refuse container. Likewise, second grabber arm 44b can rotate about axis 45b in a counter-clockwise direction about axis 45b to grasp a refuse container and in a clockwise direction about axis 45b to release the refuse container. Electric motors 154 can be positioned at opposite ends of carriage 46.

In some embodiments, first grabber arm 44a and second grabber arm 44b are configured to be driven to pivot or rotate about axes 45 independently. In other embodiments, the rotation (e.g., degree and/or direction) of first grabber arm 44a and second grabber arm 44b are related (e.g., through a gearing system, with connection members, etc.).

Figure 15:
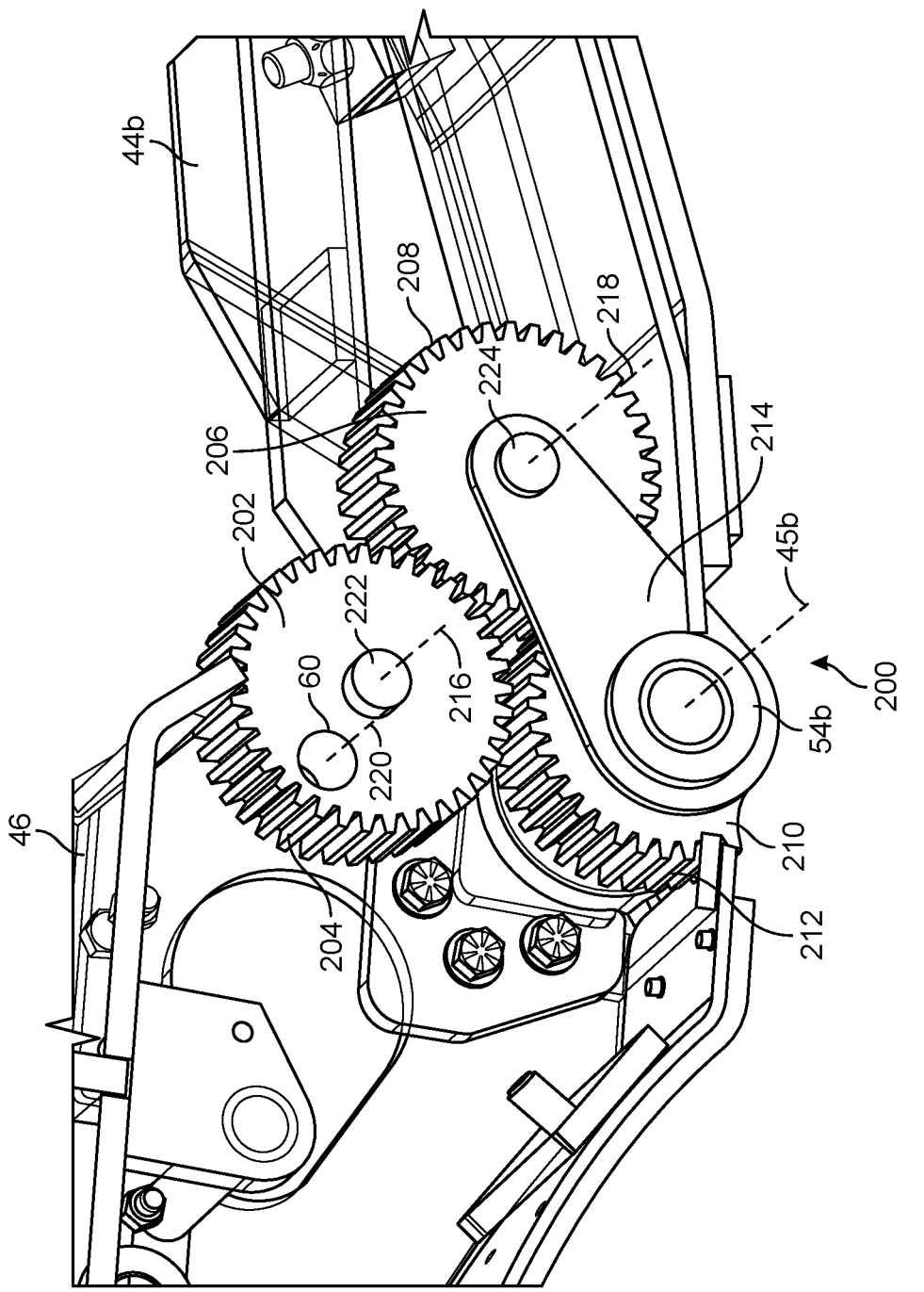
FIG. 15 is a perspective view of the eccentric gearing system of the grabber assembly of FIG. 9, according to an exemplary embodiment.

Referring particularly to FIGS. 10 and 15, grabber assembly 42 can include a gearing system 200 to transfer rotational kinetic energy from one of electric motors 154 to a corresponding or associated one of grabber arms 44. For example, gearing system 200 as shown in FIG. 9 is configured to transfer rotational kinetic energy from electric motor 154b to second grabber arm 44b. A similar and/or symmetric gearing system can be used at an opposite or distal end of carriage 46 to transfer rotational kinetic energy from electric motor 154a to first grabber arm 42.

Gearing system 200 is positioned at an end of carriage 46 and is configured to transfer the rotational kinetic energy output by a driveshaft of electric motor 154b to second grabber arm 44b to pivot/rotate second grabber arm 44b about axis 45b. Gearing system 200 may be an eccentric gearing system. Gearing system 200 includes an input gear 202, a driven gear 206, and an output gear 210. Input gear 202 is configured to receive rotational kinetic energy from the driveshaft of electric motor 154b. Input gear 202 includes teeth 204 along an entire outer periphery or an outer surface. Teeth 56 of input gear 202 are configured to mesh with teeth 208 of driven gear 206. In some embodiments, input gear 202, driven gear 206, and output gear 210 are spur gears. In other embodiments, input gear 202, driven gear 206, and output gear 210 are helical gears. It should be understood that input gear 202, driven gear 206, and output gear can be any types of gears. A similar and/or symmetric (e.g., mirrored) gearing system can be positioned at an opposite end of carriage 46 to transfer the rotational kinetic energy output by a driveshaft of electric motor 154a to first grabber arm 44a to pivot/rotate first grabber arm 44a about axis 45a.

Output gear 210 includes teeth 212 along only a portion of an outer periphery or an outer surface thereof. In some embodiments, output gear 210 includes teeth 212 along an entire perimeter or outer periphery/surface thereof. Teeth 212 of output gear 210 is configured to mesh with teeth 208 of driven gear 206. Output gear 210 can have the form of a sector of a circle, with teeth 212 disposed or formed along an outer radius thereof. In some embodiments, output gear 210 is configured to pivot an angular amount that is less than 360 degrees.

Input gear 202 is rotatably coupled with carriage 46 near the end of carriage 46 that rotatably/pivotally couples with second grabber arm 44b. Input gear 202 can be fixedly or rotatably coupled with a shaft that fixedly or rotatably couples with carriage 46. For example, input gear 202 can be rotatably mounted (e.g., with a bearing) to the shaft that fixedly couples with carriage 46. In other embodiments, input gear 202 is fixedly coupled with the shaft that rotatably couples (e.g., with a bearing) with carriage 46. In either case, input gear 202 is translationally fixedly coupled with carriage 46, but can rotate relative to carriage 46. In some embodiments, input gear 202 is rotatably coupled with carriage 46 at an aperture, a hole, a bore, a recess, etc., shown as aperture 60. Aperture 60 is radially offset from a central axis 216 of input gear 202. In some embodiments, a shaft extends therethrough aperture 60 and rotatably couples input gear 202 with carriage 46 such that input gear 202 rotates about axis 220 that extends therethrough a center of aperture 60.

In some embodiments, input gear 202 is driven to rotate by electric motor 154b through aperture 60. Aperture 60 can extend at least partially (or completely) through a thickness of input gear 202 and is configured to receive a pin, a cylindrical member, a post, etc., therethrough. In some embodiments, electric motor 154b is configured to drive input gear 202 with a post, a pin, a cylindrical member, a correspondingly shaped protrusion, etc., that is a driveshaft of electric motor 154b and is received therewithin aperture 60. In some embodiments, the post that is received within aperture 60 is slidably or fixedly coupled with an inner surface, an inner periphery, an inner perimeter, etc., of aperture 60. In some embodiments, electric motor 154b drives input gear 202 to rotate about axis 220 through a coupling therebetween the driveshaft and a protrusion 222. Protrusion 222 is positioned at a center point of input gear 202.

Figure 19:
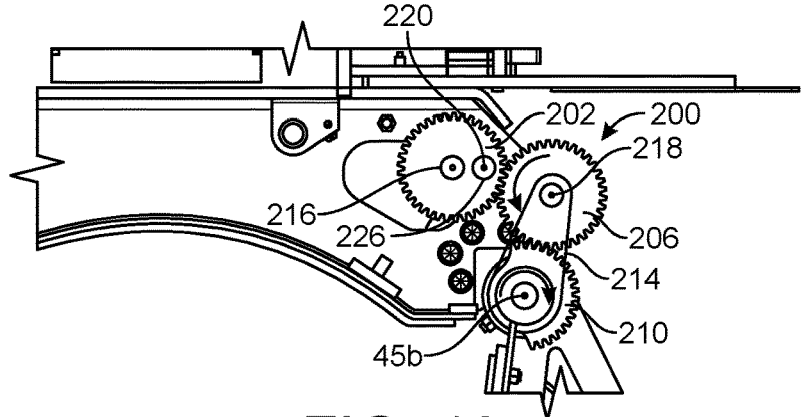

Input gear 202 is configured to drive gear 206 through the meshed coupling therebetween. In some embodiments, gear 206 is rotatably coupled with carriage 46. In some embodiments, a linkage, a coupling member, a bar, a beam, etc., shown as linkage 226 (see FIG. 19). For example, linkage 226 can extend therebetween center points of input gear 202 and gear 206 to rotatably couple input gear 202 and gear 206. In some embodiments, gear 206 includes a protrusion 224 similar to protrusion 222. Protrusion 224 is positioned at a center point of gear 206. In some embodiments, linkage 226 extends therebetween protrusion 222 and protrusion 224 to link input gear 202 and gear 206. Linkage 226 can include apertures, bores, holes, etc., at opposite ends that are correspondingly shaped with protrusions 222 and 224. In some embodiments, protrusions 222 and 224 are received therewithin the correspondingly shaped apertures of linkage 226 and slidably or pivotally couple with the correspondingly shaped apertures. In this way, a distance therebetween axis 216 and axis 218 (axis 218 extends through a center point of gear 206) is fixed. Gear 206 can rotate or pivot about axis 218. Additionally, gear 206 can rotate or pivot about axis 220 of input gear 202 as input gear 202 is driven to rotate about axis 220 by electric motor 154b.

Gear 206 is configured to drive output gear 210, according to an exemplary embodiment. Output gear 210 can be fixedly coupled with an elongated member, a cylindrical member, a post, etc., of second grabber arm 44b. In some embodiments, output gear 210 is fixedly coupled with a portion of adapter assembly 43b that pivots/rotates with second grabber arm 44b. In some embodiments, an inner periphery of a central aperture of output gear 210 is fixedly coupled with an outer periphery of a cylindrical member of adapter assembly 43b. Output gear 210 can be mounted on (e.g., fixedly coupled with) bushing 54b. In some embodiments, output gear 210 is press fit or interference fit with an outer perimeter or an outer periphery of bushing 54b. Output gear 210 can be positioned at any position along a height of bushing 54b. In some embodiments, output gear 210 is mounted to bushing 54b at a bottom end, a top end, or at a position therebetween.

A linkage 214 extends therebetween output gear 210 and gear 206. Linkage 214 can be the same as or similar to linkage 226. Linkage 214 can include apertures at opposite ends that rotatably or slidably couple with protrusion 224 and bushing 54b. In some embodiments, a distance between axis 218 and axis 45b is fixed due to linkage 214. However, gear 206 can rotate about axis 45b relative to output gear 210. Linkage 214 is free to rotate or pivot about axis 45b. Linkage 214 can be driven to rotate about axis 45b due to rotation of input gear 202 about axis 220 and rotation and translation of gear 206 relative to input gear 202.

Output gear 210 can be driven to rotate/pivot about axis 45b. In some embodiments, axis 45b extends through the center point of output gear 210. Output gear 210 is configured to rotate at least an angular amount $\theta_{range}$. In some embodiments, the angular amount $\theta_{range}$ is an angular amount between a fully released position of second grabber arm 44b (shown in FIG. 16) and a fully grasped position of second grabber arm 44b. For example, second grabber arm 44b can be configured to rotate/pivot an angular amount $\theta_{range}=90°$, an angular amount $\theta_{range}=120°$, an angular amount $\theta_{range}=160°$, etc., or any other angular amount. In some embodiments, the angular amount $\theta_{range}$e is a maximum allowable angular amount that each of grabber arms 44 can rotate from the fully released position to a position/configuration where end portions of grabber arms 44 are substantially in contact.

Gearing system 200 can be positioned inside of carriage 46. For example, the various gears, shafts, etc., of gearing system 200 can be mounted or rotatably coupled with an inner surface of a bottom member of carriage 46. Carriage 46 can be a hollow structural member having top and bottom structural members (e.g., plates) that are substantially parallel to each other and define an overall height of carriage 46. Gearing system 200 can be positioned at an inner surface of either of the top and bottom structural members. For example, gearing system 200 can be positioned at a top (an interior) surface of the bottom structural member or at a bottom (an interior) surface of the top structural member. In other embodiments, gearing system 200 is positioned outside of carriage 46 (e.g., on a top surface or on a bottom surface of carriage 46). If gearing system 200 is positioned outside of an inner volume of carriage 46, a housing member can be removably coupled with carriage 46 to contain at least a portion of gearing system 200 therewithin.

Output gear 210 can be driven to rotate in a first direction (e.g., clockwise) about axis 45b to pivot/rotate second grabber arm 44b into the grasped configuration. Likewise, output gear 210 can be driven to rotate in a second direction (e.g., counter-clockwise) about axis 45b to pivot/rotate second grabber arm 44b into the fully released configuration. In some embodiments, electric motor 154b is a reversible motor and can be driven in either direction. In this way, electric motor 154b can be operated (e.g., by a control system) to drive output gear 210 to rotate/pivot in either direction, thereby driving second grabber arm 44b to pivot about axis 45b. The torque output by electric motor 154b can be transferred through gearing system 200 to second grabber arm 44b to rotate/pivot second grabber arm 44b relative to carriage 46 about axis 45b.

Figure 16:
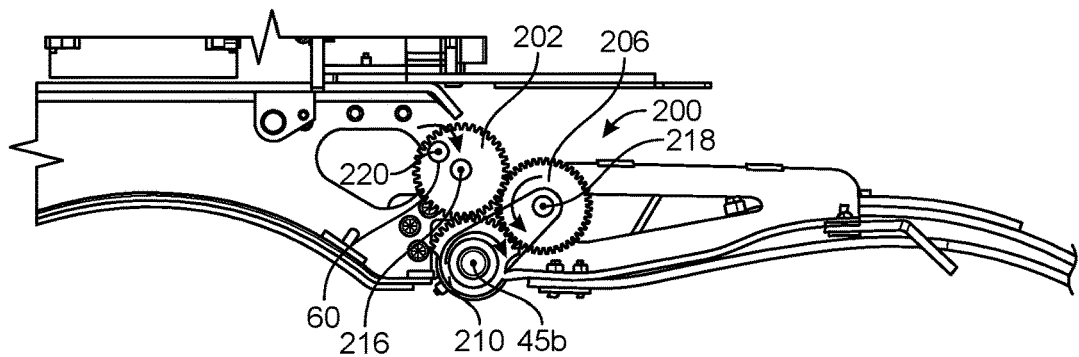
FIGS. 16-19 are top views of the eccentric gearing system of the grabber assembly of FIG. 9 as a grabber arm is driven to swing, according to an exemplary embodiment.
Figure 17:
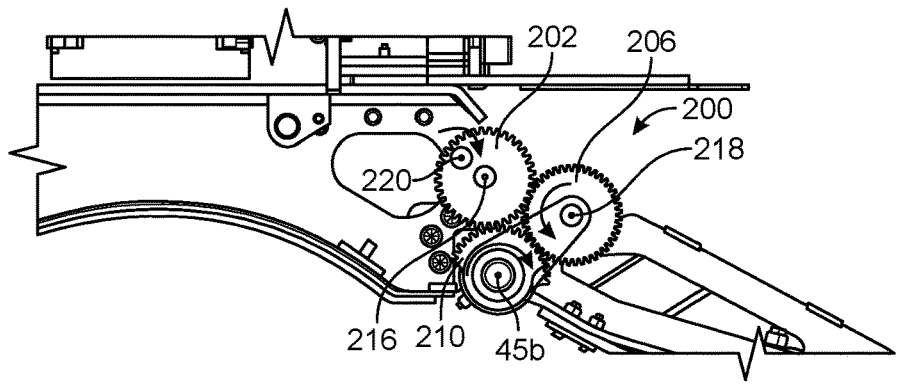
Figure 18:
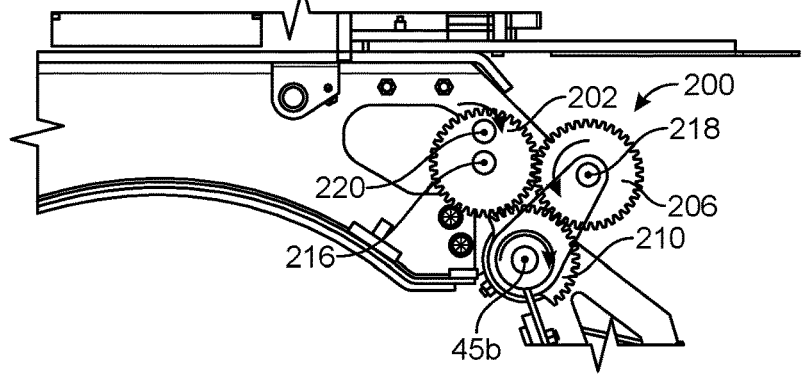

Referring particularly to FIGS. 16-19, the operation of gearing system 200 is shown in greater detail. Gearing system 200 can be driven by electric motor 154b to pivot second grabber arm 44b about axis 45b. FIG. 16 shows the configuration of gearing system 200 when second grabber arm 44b is in a fully released configuration. FIGS. 17-18 show the configuration of gearing system 200 as input gear 202 is driven to rotate about axis 220 that extends therethrough aperture 60.

As gearing system 200 is driven by electric motor 154b, input gear 202 is driven to rotate about axis 220 (e.g., in a clockwise direction as shown in FIGS. 16-19). The center point of input gear 202 can rotate about axis 220 in the clockwise direction. This results in gear 206 being driven to rotate about axis 220 or central axis 216 relative to input gear 202 in a counter clockwise direction. Due to the meshed (e.g., through the teeth) coupling therebetween input gear 202 and gear 206, gear 206 also rotates about central axis 218. As gear 206 rotates about central axis 218 and swings about central axis 216 or axis 220 relative to input gear 202, output gear 210 is driven to rotate in the clockwise direction due to the meshed coupling (through the teeth) therebetween gear 206 and output gear 210. Rotation of output gear 210 in the clockwise direction results in second grabber arm 44b being rotated about axis 45b in the clockwise direction relative to carriage 46.

In this way, electric motor 154b can be configured to drive input gear 202 to rotate about axis 220 in the clockwise direction to pivot/rotate second grabber arm 44b about axis 45b in the clockwise direction (e.g., to grasp containers). Electric motor 154b can also drive input gear 202 to rotate about axis 220 in the counter clockwise direction, thereby pivoting/rotating second grabber arm 44b about axis 45b in the counter clockwise direction (e.g., to release containers). It should be understood that first grabber arm 44a can include a gearing system that is the same as or similar to (e.g., symmetric) gearing system 200.

Using an eccentric gearing system as shown in FIGS. 9-10 and 15-19 facilitates improved clamping force therebetween first grabber arm 44a and second grabber arm 44b to grasp containers. Specifically, an initial angular speed of first grabber arm 44a and second grabber arm 44b when transitioning from the fully release configuration to a partially grasped configuration is relatively high and the exerted torque is relatively low. However, as first grabber arm 44a and second grabber arm 44b swing to the fully grasped or to a more grasped configuration (e.g., as second grabber arm 44b swings about axis 45b in the clockwise direction as shown in FIGS. 16-19), the angular speed of grabber arms 44 decreases while the torque exerted increases. This facilitates increased clamping force as first and second grabber arms 44 transition or are driven to rotate into a more grasped configuration.

Gearing system 200 converts a constant rotational speed input (e.g., at input gear 202) to a variable output rotational arm speed. For example, input gear 202 can be rotated by electric motor 154b at a constant angular speed that results in a varying angular speed of second grabber arm 44b as second grabber arm 44b rotates about axis 45b. Gearing system 200 provides a variable gear ratio as second grabber arm 44b swings about axis 45b. This facilitates a faster rotational speed of second grabber arm 44b under no-load as well as improved clamping force and precision when second grabber arm 44b approaches the fully-clamped configuration.

Figure 11:
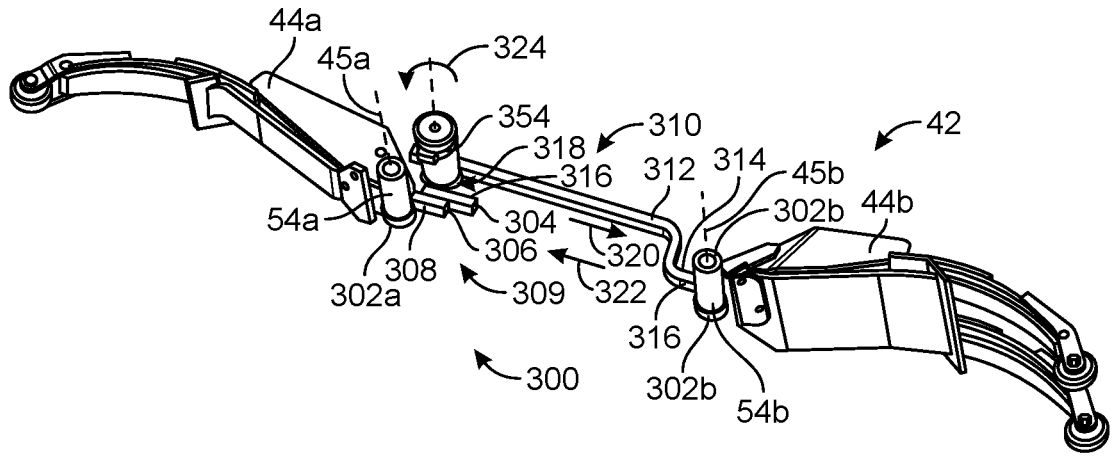
FIG. 11 is a perspective view of an electric rack and pinion system for the grabber assembly of FIG. 1, according to an exemplary embodiment.

Referring now to FIG. 11, an electric rack and pinion system 300 can be used to drive first grabber arm 44a and second grabber arm 44b, according to an exemplary embodiment. Electric rack and pinion system 300 includes an electric motor 354 configured to drive rack members 310 and 309. Electric motor 354 is configured to drive rack members 310 and 309 to translate in opposing directions.

Electric motor 354 can include an output driveshaft and an output gear 318 to transfer rotational kinetic energy to translate rack members 310 and 309. Electric motor 354 can include a gear box configured to increase torque output provided at output gear 318. Output gear 318 is configured to mesh with teeth 316 of rack member 309. Rack member 309 includes a first member 304 and a second member 306. Member 304 and member 306 can be integrally formed with each other. Member 304 includes teeth 316 configured to mesh with teeth of output gear 318. Member 306 includes teeth 308 configured to mesh with teeth of arm gear 302a. Teeth 316 and teeth 308 can be positioned on opposite surfaces of rack member 309.

Arm gear 302a can be integrally formed or fixedly coupled with bushing 54a of first grabber arm 44a. In some embodiments, arm gear 302a is positioned at a bottom end of bushing 54a. In other embodiments, arm gear 302a is positioned at an upper or top end of bushing 54a. In still other embodiments, arm gear 302a is positioned between the upper or top end and the bottom end of bushing 54a. In some embodiments, arm gear 302a is press fit on an outer surface, an outer perimeter, an outer periphery, etc., of bushing 54a.

Rack member 310 can include a first portion 312 and a second portion 314. First portion 312 and second portion 314 can be integrally formed with each other. First portion 312 and second portion 314 can be elongated structural members, tubular members, square tubular members, square structural members, rectangular members, circular tubular members, etc., or any other structural member that provides sufficient length and can provide sufficient tensile and compressive strength. For example, rack member 310 can be a steel member.

First portion 312 includes teeth on a first surface configured to mesh with teeth of output gear 318. Second portion 314 includes teeth 316 on a surface configured to mesh with teeth of arm gear 302b. In some embodiments, the surface of first portion 312 that includes the teeth configured to mesh with teeth of output gear 318 is substantially parallel with the surface of second portion 314 that includes teeth 316.

Second portion 314 and first portion 312 can be laterally offset from each other. For example, rack member 310 can include an S-shaped or N-shaped bend that defines the transition between first portion 312 and second portion 314. In an exemplary embodiment, first portion 312 and second portion 314 both define a longitudinal axis that extends therethrough. The longitudinal axes of first portion 312 and second portion 314 can be substantially parallel to each other and offset in one plane. For example, first portion 312 and second portion 314 can be offset from each other in a plane that is substantially parallel with a bottom or top surface of carriage 46. In some embodiments, first portion 312 and second portion 314 are substantially parallel to each other and are offset a distance in a plane that is substantially perpendicular to one of or both axes 45. Axis 45a and axis 45b can be substantially parallel to each other and a distance therebetween is substantially equal to an overall width of carriage 46.

Rotation of output gear 318 in a first direction translates one of rack member 310 and rack member 309 in a first direction (e.g., direction 322) and the other one of rack member 310 and rack member 309 in a second direction (e.g., direction 320) that is opposite the first direction. Likewise, rotation of output gear 318 in an opposite direction translates rack member 310 and rack member 309 in opposite directions. In some embodiments, rack member 310 and rack member 309 are configured to translate in opposite directions. For example, as rack member 310 translates in direction 322, rack member 309 translates in direction 320. Likewise, as rack member 310 translates in direction 320, rack member 309 translates in direction 322.

For example, rotation of output gear 318 in direction 324 (e.g., clockwise) can drive rack member 309 to translate in direction 320, thereby pivoting first grabber arm 44a outwards (through the meshed coupling between teeth 308 of member 306 and arm gear 302a). Rotation of output gear 318 in direction 324 also drives rack member 310 to translate in direction 322, thereby pivoting second grabber arm 44b outwards (through the meshed coupling between teeth 316 of second portion 314 and arm gear 302b). Similarly, rotation of output gear 318 in a direction opposite direction 324 drives rack member 309 to translate in direction 322 (thereby pivoting grabber arm 44a inwards) and drives rack member 309 to translate in direction 320 (thereby pivoting second grabber arm 44b inwards). In this way, electric motor 354 can be operated to rotate grabber arms 44 inwards (to grasp a refuse container) or to rotate grabber arms 44 outwards (to release a refuse container or spread grabber arms 44 apart).

In some embodiments, rack member 309 defines a longitudinal axis that extends therethrough. The longitudinal axis that extends through rack member 309 can be substantially parallel to one or both of the longitudinal axes of first portion 312 and second portion 314 of rack member 310. In some embodiments, rack member 309 and rack member 310 are meshingly coupled (e.g., through teeth) on opposite sides of output gear 318. Rack members 309 and 310 can be rotatably fixed relative to carriage 46. For example, rack members 309 and 310 can be configured to slidably couple with a track, a recess, a groove, a guide member, etc., of carriage 46.

Figure 12:
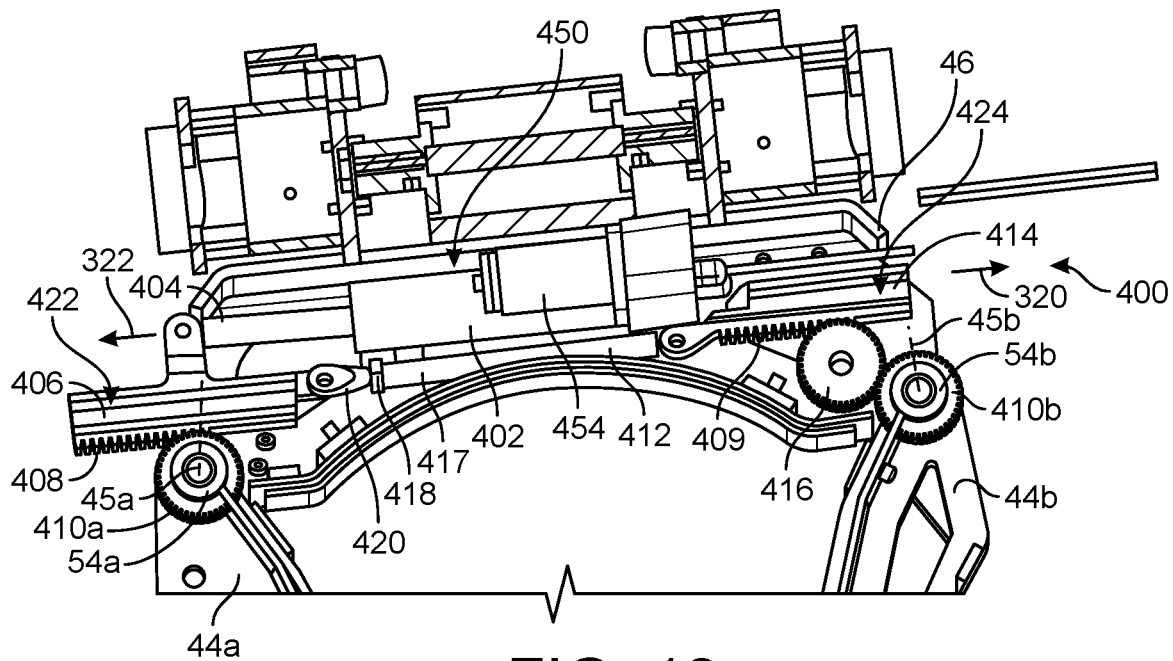
FIG. 12 is a perspective sectional view of an electric rack and pinion system for the grabber assembly of FIG. 1, according to an exemplary embodiment.

Referring now to FIG. 12, another electric rack and pinion system 400 is shown, according to an exemplary embodiment. Electric rack and pinion system 400 can include an electric linear actuator 450 that drives rack members, bars, beams, rods, elongated members, etc., shown as rack member 406 and rack member 414 to translate, thereby pivoting first grabber arm 44a and second grabber arm 44b to grasp or release a refuse container.

Electric linear actuator 450 includes an electric motor 454 and an extension member 402. Extension member 402 can include a lead screw and a nut that is coupled with an output driveshaft of electric motor 454 and transfers the rotational output of electric motor 454 to translatory motion. Electric linear actuator 450 includes an output shaft 404 configured to extend and retract. Output shaft 404 is configured to extend and retract in response to operation (e.g., a direction of rotation) of electric motor 454. Output shaft 404 can be received within extension member 402 and may slidably couple with an apertures of extension member 402. In some embodiments, output shaft 404 is coupled with the lead screw of extension member 402 and translates (e.g., extends or retracts) with the lead screw. In some embodiments, extension member 402 is or includes a ball screw. For example, a portion of output shaft 404 can include ball screw threads along a ball screw portion, and extension member 402 can include a ball nut configured to threadingly couple with the ball screw portion of output shaft 404.

An end portion of output shaft 404 can be removably or fixedly coupled with a connection portion (e.g., a flange, a protrusion, etc.) of rack member 406. For example, the end portion of output shaft 404 can be removably coupled with the connection portion of rack member 406 with fasteners. In some embodiments, the end portion of output shaft 404 can rotate relative to rack member 406. In other embodiments, the end portion of output shaft 404 is fixedly coupled with rack member 406. Output shaft 404 can provide pushing or pulling forces to rack member 406 through the coupling of the end portion of output shaft 404 and the corresponding connection portion of rack member 406.

Rack member 406 includes teeth 408 configured to mesh with a corresponding arm gear 410a. Arm gear 410a can be fixedly coupled (e.g., through a keyed connection, a press or interference fit, etc.) with bushing 54a. In some embodiments, arm gear 410a is fixedly coupled with an exterior surface of bushing 54a. Arm gear 410a can be rotated about axis 45a to pivot or rotate first grabber arm 44a about axis 45a.

Rack member 406 is coupled with rack member 414 through a structural member, a coupling member, an elongated member, a rod, etc., shown as tie rod 412. Tie rod 412 can extend therebetween rack member 406 and rack member 414 and couple rack member 406 and rack member 414. Tie rod 412 can translatably couple rack member 406 and rack member 414 with each other. Tie rod 412 can removably or fixedly couple at either end with corresponding portions of rack member 406 and rack member 414.

Rack member 414 includes teeth 409 configured to mesh with a gear 416. Gear 416 is rotatably coupled with carriage 46. Gear 416 can be translationally fixedly coupled with carriage 46. Gear 416 can be rotatably coupled with carriage 46 with a fixed or rotatable shaft. For example, gear 416 can be mounted on a shaft (e.g., with a keyed interface, with a press fit, etc.) that is rotatably coupled (e.g., with a bearing) with carriage 46. In other embodiments, the shaft is fixedly coupled with carriage 46 and gear 416 is rotatably coupled with the shaft (e.g., through a bearing) such that gear 416 can rotate relative to carriage 46. In either case, gear 416 is rotatable relative to carriage 46 and is translationally fixedly coupled with carriage 46.

Gear 416 is configured to drive arm gear 410b. Arm gear 410b can be the same as or similar to arm gear 410a. Arm gear 410b can be fixedly coupled or press fit with an outer periphery (e.g., an outer surface) of bushing 54b. Arm gear 410b is configured to rotate relative to carriage 46 to facilitate pivoting/rotation of second grabber arm 44b about axis 45b relative to carriage 46. Translatory motion of rack member 414 drives arm gear 410b to pivot/rotate about axis 45b, thereby rotating/pivoting second grabber arm 44b.

In some embodiments, tie rod 412 includes an outer member 417 and an inner member 420. Inner member 420 is configured to be received within outer member 417. In some embodiments, inner member 420 is threadingly coupled with an inner surface of outer member 417 and can be extended or retracted relative to outer member 417. Tie rod 412 can include a locking member, shown as lock nut 418. Lock nut 418 can be tightened once a desired extension between outer member 417 and inner member 420 is achieved to fixedly couple outer member 417 and inner member 420.

Lock nut 418 can be loosened and inner member 420 and outer member 417 can be adjusted to a desired extension. In some embodiments, inner member 420 and outer member 417 can be adjusted to increase or decrease an overall length of tie rod 412. Increasing the overall length of tie rod 412 results in first grabber arm 44a and second grabber arm 44b being pivoted closer (e.g. into a more-grasped configuration) together. Likewise, decreasing the overall length of tie rod 412 results in first grabber arm 44a and second grabber arm 44b being pivoted further apart (e.g., into a more-released configuration). In this way, a distance between first grabber arm 44a and second grabber arm 44b when in the fully grasped configuration can be adjusted (e.g., increased) to facilitate grasping various sized refuse containers.

Translatory motion of rack member 406 results in arm gear 410a being rotated about axis 45a and arm gear 410b being rotated about axis 45b, thereby pivoting first grabber arm 44a and second grabber arm 44b. Rack member 406 and rack member 414 are configured to translate in a same direction (e.g., in direction 322 or direction 320), thereby causing pivotal/rotatable motion of first grabber arm 44a and second grabber arm 44b in opposite directions (e.g., inwards to grasp a container or outwards to release a container or outwards to release a container).

For example, electric motor 454 can be driven to rotate in a first direction to extend output shaft 404, thereby translating rack member 406 and rack member 414 in direction 322. As rack member 406 and rack member 414 are translated in direction 322, arm gear 410a is driven to rotate about axis 45a in a counter-clockwise direction, while arm gear 410b is driven to rotate about axis 45b in a clockwise direction. Likewise, electric motor 454 can be driven to rotate in a second direction to retract output shaft 404, thereby translating rack member 406 and rack member 414 in direction 320 (opposite direction 322). As rack member 406 and rack member 414 are translated in direction 320, arm gear 410a is driven to rotate about axis 45a in a clockwise direction about axis and arm gear 410b is driven to rotate about axis 45b in a counter-clockwise direction. In this way, electric motor 454 can be operated to pivot/rotate first grabber arm 44a and second grabber arm 44b to grasp and release refuse containers.

Referring still to FIG. 12, rack member 406 and rack member 414 can each include a channel, a slot, a recess, etc., shown as track 422 and track 424, respectively. Particularly, rack member 406 includes track 422 and rack member 414 includes track 424. Track 424 can have a square shape, a trapezoidal shape, a curved shape, an irregular shape, etc. Track 424 and track 422 can be the same as or similar to each other. Track 424 and track 422 are configured to slidably couple with a corresponding surface, protrusion, grooves, member, etc., of carriage 46. Track 422 and track 424 facilitate translator (e.g., translational) motion of rack member 406 and rack member 414, respectively. Additionally, track 422 and track 424 facilitate alignment of rack member 406 and rack member 414, respectively.

Figure 13:
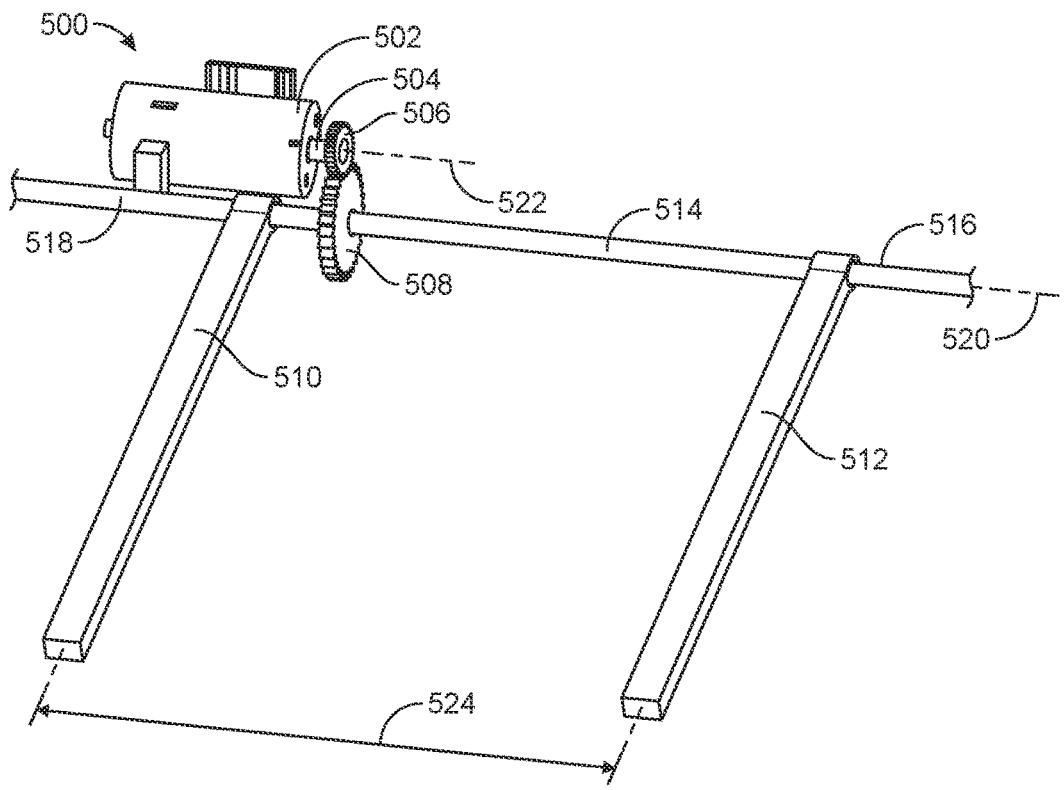
FIG. 13 is a perspective view of a lead screw and an electric motor configured to translate the lead screw, according to an exemplary embodiment.

Referring particularly to FIG. 13, an electric lead screw system 500 is shown, according to an exemplary embodiment. Electric lead screw system 500 can be implemented with electric rack and pinion system 400, or electric rack and pinion system 300. Electric lead screw system 500 can be used to transfer rotational motion from an electric motor to translator motion.

Electric lead screw system 500 includes an electric motor 502. In some embodiments, electric motor 502 is the same as or similar to electric motor 454, electric motor 354, and/or electric motors 154. Electric motor 502 is configured to output rotational kinetic energy through a driveshaft 504. In some embodiments, electric motor 502 includes an internal gearbox that increases torque output through driveshaft 504. Driveshaft 504 defines a longitudinal axis 522 and is configured to rotate about longitudinal axis 522. Driveshaft 504 includes an output gear 506. Output gear 506 can be a spur gear, a helical gear, etc., or any other type of gear. Output gear 506 is fixedly and rotatably coupled with driveshaft 504. In some embodiments, output gear 506 is press fit onto driveshaft 504. In other embodiments, output gear 506 is fixedly and rotatably coupled with driveshaft 504 with a key.

Output gear 506 is configured to mesh with a drive gear 508. Output gear 506 can transfer the rotational kinetic energy output to an elongated member 514 with which drive gear 508 is fixedly and rotatably coupled. In an exemplary embodiment, elongated member 514 includes threads along portions at opposite ends. The threaded end portions of elongated member 514 are configured to be received within and threadingly couple with corresponding apertures, inner volumes, receiving portions, threads, etc., of outer members 518 and 516. In some embodiments, outer members 518 and 516 are outer threaded portions of elongated member 514. Outer members 518 and 516 can each receive the threaded end portions of elongated member 514 within a correspondingly shaped and threaded inner volume, inner bore, aperture, etc. In other embodiments, outer members 518 and 516 are configured to be received within and threadingly couple with a correspondingly threaded aperture, bore, hole, etc., of elongated members 510 and 512, respectively. The threaded end portions of elongated member 514 can have oppositely oriented threads. For example, one of the threaded end portions may have right-hand oriented threads, while the other threaded end portion may have left-hand oriented threads. In some embodiments, the threaded end portions of elongated member 514 have similarly oriented threads (e.g., both are left-hand oriented or both are right-hand oriented) and outer members 518 and 516 are configured to receive and threadingly couple with the threaded end portions of elongated member 514.

As electric motor 502 is driven, output gear 506 drives drive gear 508, thereby driving elongated member 514 to rotate about longitudinal axis 520. Longitudinal axis 520 extends therethrough elongated member 514. Outer members 518 and 516 can be rotatably stationary relative to elongated member 514 such that as elongated member 514 rotates, outer members 518 and 516 do not rotate, thereby resulting in relative rotation between elongated member 514 and outer members 518 and 516. The threaded coupling between elongated member 514 and outer members 518 and 516 and the relative rotation between elongated member 514 and outer members 518 and 516 results in outer members 518 and 516 being driven (e.g., translated) apart or translated closer together. Likewise, if outer members 518 and 516 are outer threaded portions of elongated member 514, rotation of elongated member drive elongated members 510 and 512 to translate along elongated member 514 (e.g., along an entire length of the threads of outer members 518 and 516).

Outer members 518 and 516 can include elongated members, bars, beams, structural components, etc., shown as elongated members 510 and 512. Elongated members 510 and 512 can be fixedly coupled with outer members 518 and 516. In some embodiments, elongated members 510 and 512 are threadingly coupled with outer members 518 and 516 and are configured to translate along outer members 518 and 516 of elongated member 514 as elongated member 514 rotates. In some embodiments, elongated members 510 and 512 are mounted to outer members 518 and 516. Elongated members 510 and 512 can be any structural component, translatory component, etc., of any of electric rack and pinion system 400 or electric rack and pinion system 300. Elongated members 510 and 512 are shown spaced a distance 524 apart. Operating electric motor 502 in a first direction results in distance 524 increasing (as elongated members 510 and 512 are driven apart, while operating electric motor 502 in a second direction results in distance 524 decreasing (as elongated members 510 and 512 are driven closer together). For example, elongated members 510 and 512 can each be rack and pinion members, each configured to drive one or more gears to pivot first grabber arm 44a and second grabber arm 44b. In some embodiments, outer ends of outer member 518 and outer member 516 are pivotally coupled with carriage 46 and one of grabber arms 44 to drive grabber arms 44 to pivot.

Figure 14:
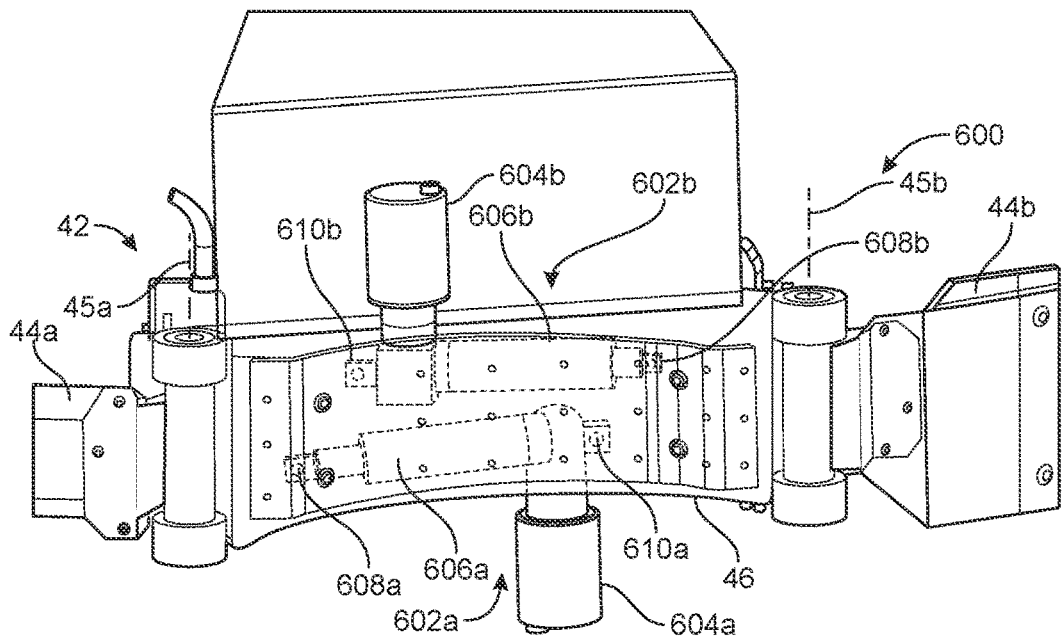
FIG. 14 is a perspective view of an electrically actuated grabber assembly, according to an exemplary embodiment.

Referring now to FIG. 14, an electric system 600 for operating grabber assembly 42 includes electric linear actuators 602. Electric linear actuators 602 are each configured to pivot/rotate grabber arms 44 about axes 45. Specifically, electric linear actuator 602a is configured to pivot/rotate first grabber arm 44a about axis 45a, while electric linear actuator 602b is configured to pivot/rotate second grabber arm 44b about axis 45b.

Electric linear actuators 602 each include electric motors 604. Electric motors 604 can be the same as or similar to any of the other electric motors described herein. In some embodiments, any of electric motors 604 (or any other electric motors described herein) include gear boxes to increase or decrease torque output. Any of electric motors 604 (or any other electric motors described herein) can also include a brake. Electric motors 604 can be operated by a controller or a control system.

Electric linear actuators 602 include an extendable member 606. Extendable member 606 is configured to be driven by electric motor 604 to expand or retract. Extendable member 606 can include telescoping members (e.g., an inner member and an outer member that receives the inner member therewithin). The inner member of extendable members 606 can be driven by electric motors 604 translate (e.g., extend or retract) relative to the outer member, thereby pivoting or rotating a corresponding grabber arm 44 about the corresponding axis 45.

For example, electric linear actuator 602a can be pivotally or rotatably coupled with first grabber arm 44a at a first or proximate end 608a and pivotally or rotatably coupled with carriage 46 at a second or distal end 610a. Likewise, electric linear actuator 602b can be pivotally or rotatably coupled with second grabber arm 44b at a first or proximate end 608b and pivotally or rotatably coupled with carriage 46 at a second or distal end 610b. Electric linear actuator 602a and electric linear actuator 602b can be independently operated to pivot first grabber arm 44a and second grabber arm 44b about axis 45a and axis 45b, respectively. In some embodiments, electric linear actuator 602a and electric linear actuator 602b are operated by a control system simultaneously/concurrently with each other to cause grabber assembly 42 to grasp or release a refuse container/receptacle.

Electric linear actuator 602a can be pivotally or rotatably coupled with first grabber arm 44a at a position such that extension of extendable member 606a (e.g., translation of the inner member relative to the outer member that increases an overall length of extendable member 606a) rotates first grabber arm 44a about axis 45a in a counter-clockwise direction. Similarly, retraction of extendable member 606a (e.g., translation of the inner member relative to the outer member that decreases an overall length of extendable member 606a) can rotate first grabber arm 44a about axis 45a in a clockwise direction. In some embodiments, electric linear actuator 602a is coupled with first grabber arm 44a at proximate end 608a such that extension of extendable member 606a produces a torque about axis 45a in a counter-clockwise direction.

Likewise, electric linear actuator 602b can be pivotally or rotatably coupled with second grabber arm 44b at a position such that extension of extendable member 606b (e.g., translation of the inner member relative to the outer member that increases an overall length of extendable member 606b) rotates second grabber arm 44b about axis 45b in a clockwise direction. Likewise, retraction/compression of electric linear actuator 602b can cause second grabber arm 44b to rotate about axis 45b in a counter-clockwise direction. Electric linear actuator 602b can extend or retract to pivot/rotate second grabber arm 44b in either direction.

Advantageously, electric system 600, electric lead screw system 500, electric rack and pinion system 400, electric rack and pinion system 300, and gearing system 200 are fully electric systems or are configured to be driven by electric motors, thereby facilitating a fully electric grabber assembly. While the various electric systems described herein are shown implemented with grabber assembly 42, any of the electric systems, the electric rack and pinion systems, the gearing systems, electric linear actuators, electric motors, etc., or components thereof can be used with various grabber assemblies. Advantageously, a fully-electric grabber reduces the need for a hydraulic system, is more environmentally friendly, and facilitates a more robust grabber.

It should be understood that any of the electric motors, electric linear actuators, electric devices, etc., can receive electrical energy/power from a battery system including one or more battery devices or any other energy storage devices. Similarly, any of the electric motors, electric linear actuators, or electrical devices described herein can be operated by a controller or a control system. The controller can include a processing circuit, memory, a processor, computer readable medium, etc., and may store instructions for operating any of the functions of a grabber assembly. The controller can generate control signals and provide the control signals to any of the electrical devices (e.g., the electric motors) described herein.

It should also be noted that any of the electric motors, electric linear actuators, etc., can include a brake that can lock or facilitate restricting rotational output from an output driveshaft of any of the electric motors. For example, any of the electric motors can include a drum brake configured to activate and provide a frictional force to the electric motor driveshaft to facilitate preventing rotation of the driveshaft thereof. The brake can be activated using mechanical systems, or an electrical system. For example, the brake may be an electrically activated drum brake, a mechanical brake, an electrical brake, etc. The brake can be configured to decrease output speed of the driveshaft of the electric motor or to facilitate locking a current angular position of the driveshaft of the electric motor. The brake can be operated by the same controller or control system that operates the electric motors and electric linear actuators, or can be operated by a separate control system and/or a separate controller. Additionally, any of the electric motors or linear electric actuators described herein can include appropriate gearboxes to increase or decrease output torque.

It should also be noted that any of the electrical motors, electrical actuators, or any other electrical movers can include any number of sensors configured to measure and monitor an angular position or a degree of extension. In some embodiments, the sensors are a component of the electric motors or the electric linear actuators and provide feedback signals to the controller. The controller can monitor the sensor signals to identify an angular position or a degree of extension of the electric motors or the electric linear actuators, respectively. The controller can use the sensor signal to determine a current angular orientation of grabber arms 44. In some embodiments, angular orientation of grabber arms 44 is measured directly (e.g., with a rotary potentiometer).

Figure 20:
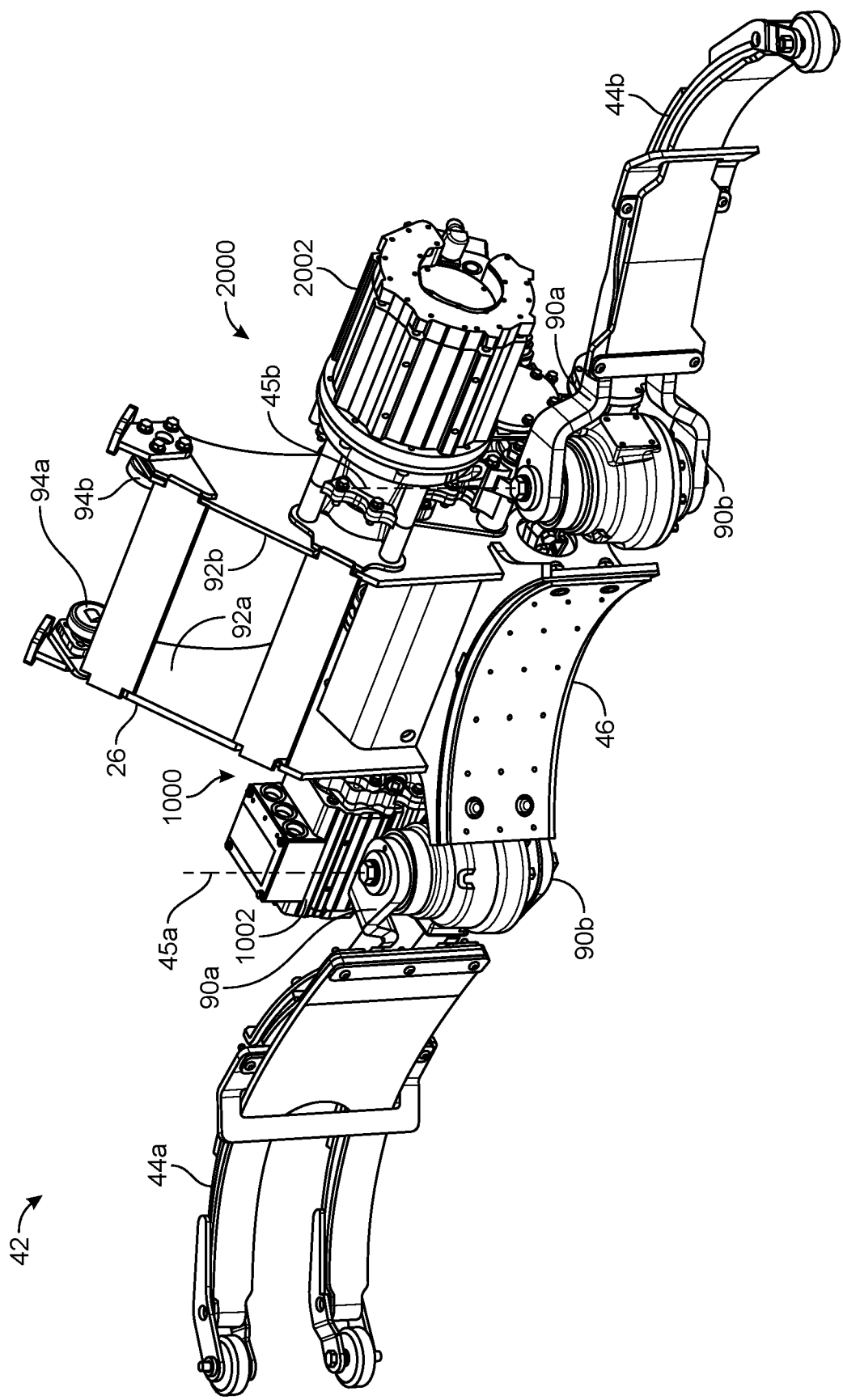
FIG. 20 is a perspective view of a grabber assembly, according to an exemplary embodiment.
Figure 21:
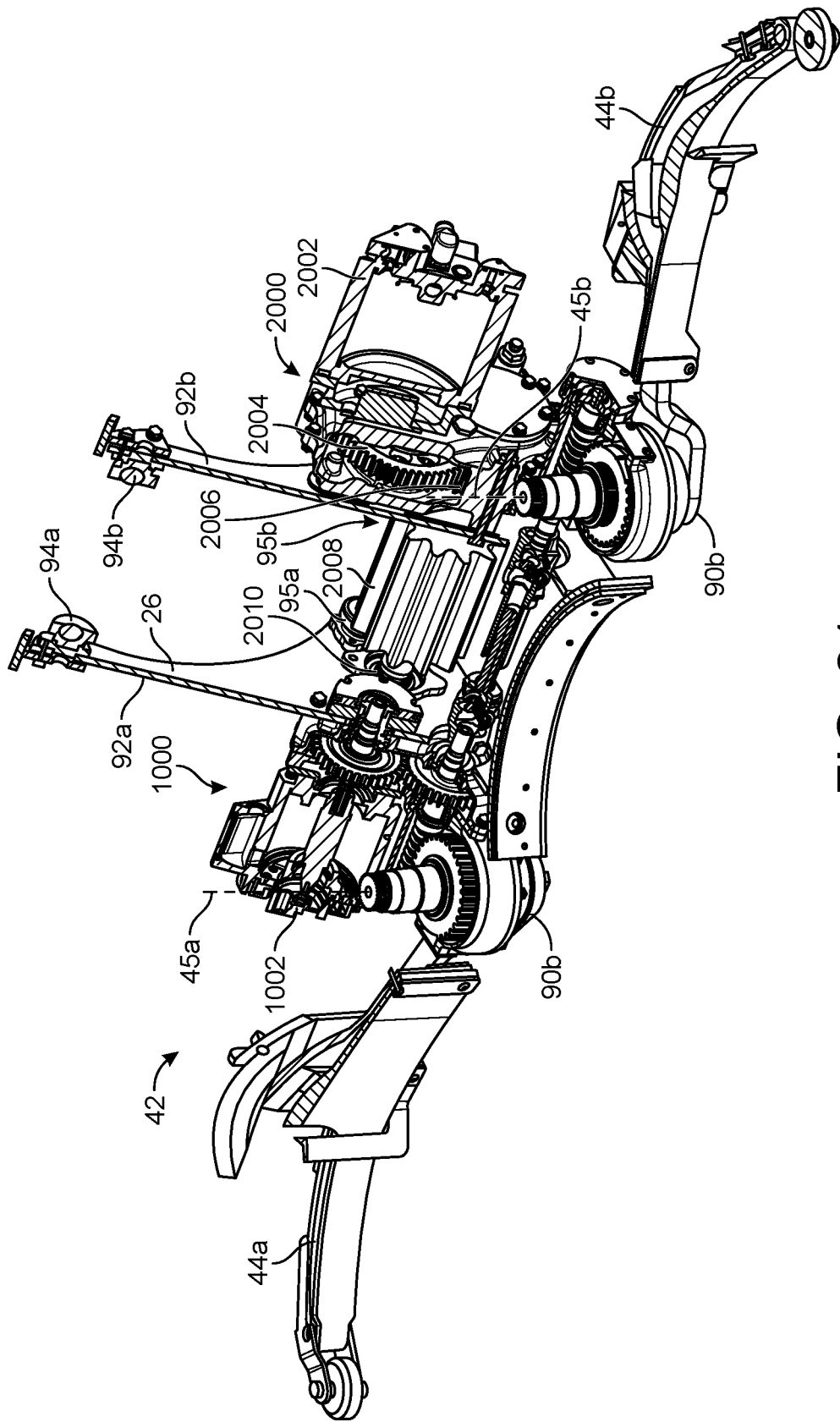
FIG. 21 is a perspective sectional view of the grabber assembly of FIG. 20, according to an exemplary embodiment.
Figure 22:
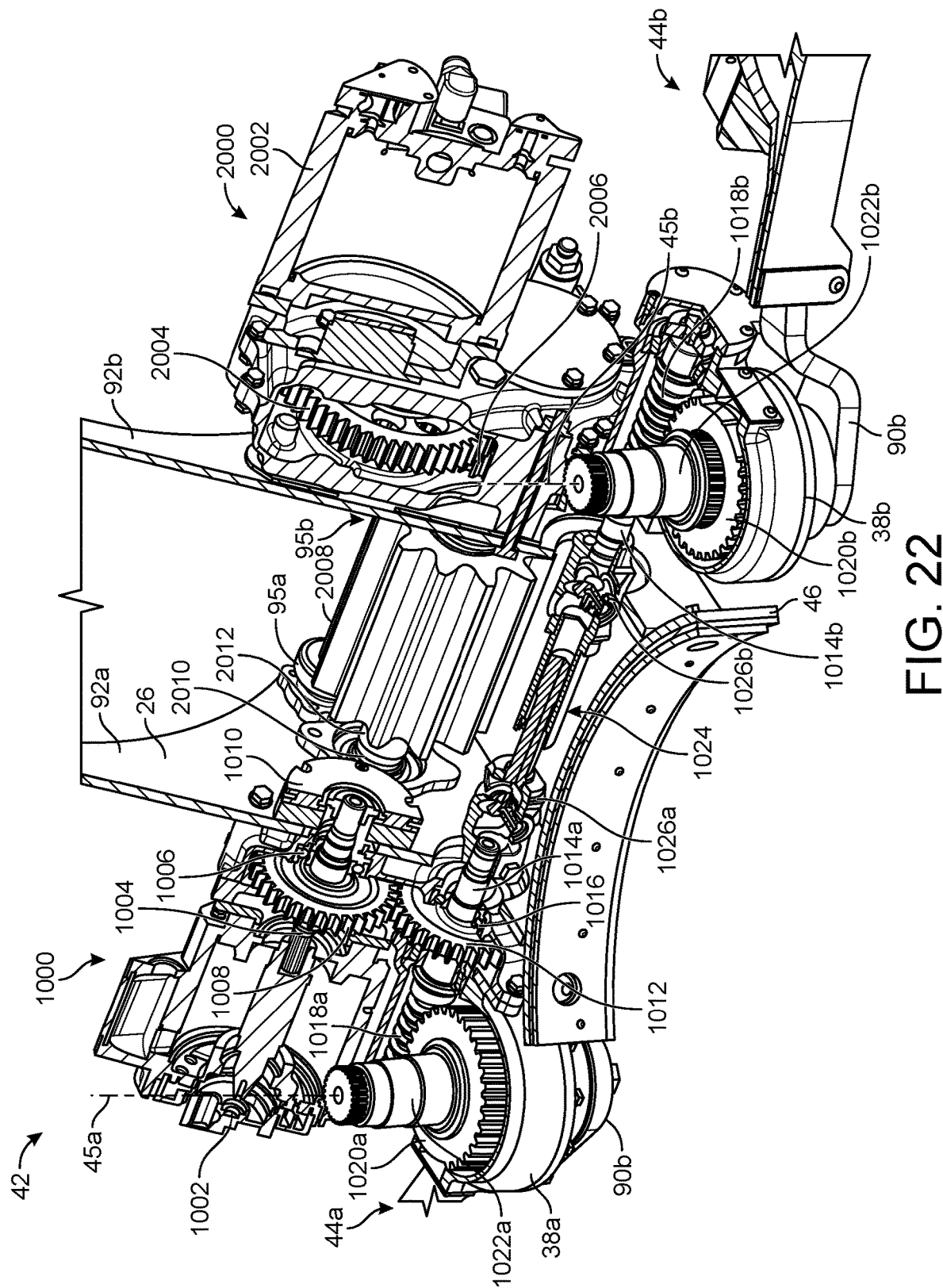
FIG. 22 is a perspective sectional view of a portion of the grabber assembly of FIG. 20, according to an exemplary embodiment.

Referring particularly to FIGS. 20-22, grabber assembly 42 is shown according to another embodiment. Grabber assembly 42 includes first grabber arm 44a, second grabber arm 44b, carriage 46, and connecting member 26. Grabber assembly 42 of FIGS. 20-22 can be the same as or similar to any of the embodiments of grabber assembly 42 as described in greater detail above with reference to FIGS. 1-19. First grabber arm 44a is configured to rotatably or pivotally couple with carriage 46 such that first grabber arm 44a can rotate or pivot relative to carriage 46 about axis 45a. Likewise, second grabber arm 44b is configured to rotatably or pivotally couple with carriage 46 such that second grabber arm 44b can rotate or pivot relative to carriage 46 about axis 45b.

Grabber assembly 42 can include an electric gripping motor system 1000 and an electric climb system 2000. Electric gripping motor system 1000 includes an electric motor, shown as gripping motor 1002 that is configured to operate to drive first grabber arm 44a and second grabber arm 44b to pivot or rotate relative to carriage 46 about axis 45a and axis 45b, respectively.

Figure 23:
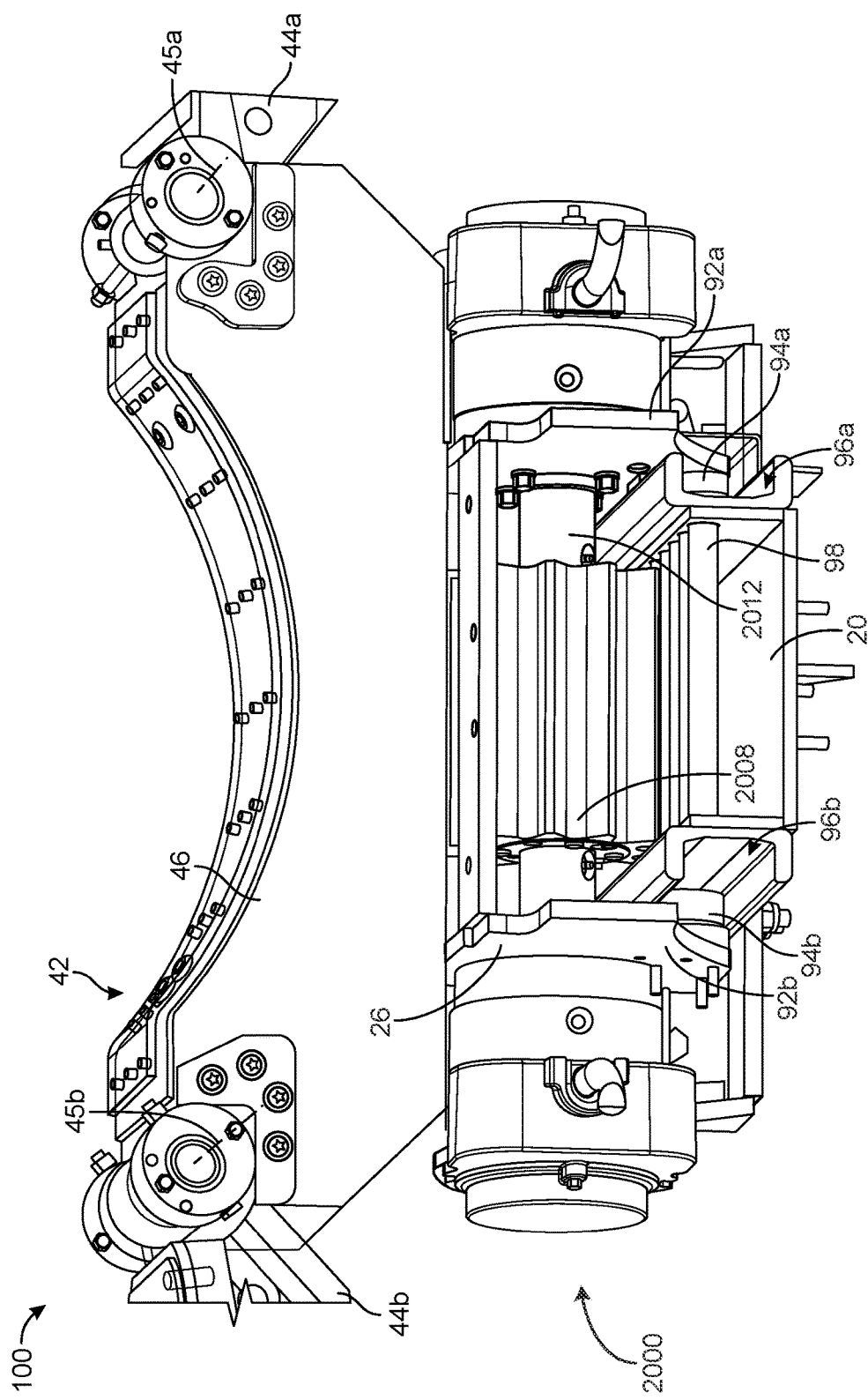
FIG. 23 is a perspective view of the grabber assembly of FIG. 20 engaging a track of a refuse vehicle, according to an exemplary embodiment.

Connecting member 26 can include a first lateral member 92a and a second lateral member 92b that are spaced a distance apart. First lateral member 92a and second lateral member 92b are substantially parallel with each other and spaced apart so that first lateral member 92a may be positioned outside of track 20 at a first lateral side of track 20, and so that second lateral member 92b may be positioned outside of track 20 at a second lateral side of track 20. First lateral member 92a includes a first roller 94a and second lateral member 92b includes a second roller 94b. First roller 94a and second roller 94b can be rotatably coupled with first lateral member 92a and second lateral member 92b, respectively, so that as grabber assembly 42 ascends or descends along track 20, first roller 94a and second roller 94b rotate. In some embodiments, first roller 94a and second roller 94b are fixedly coupled with first lateral member 92a and second lateral member 92b, respectively. First roller 94a can be received within a corresponding groove, track, recess, etc., of track 20 (e.g., recess 96a shown in FIG. 23) and second roller 94b can be received within a corresponding groove, track, recess, etc., of track 20 on an opposite lateral side of track 20 (e.g., recess 96b as shown in FIG. 23). First roller 94a and second roller 94b can be positioned at an upper end, or an upper portion of connecting member 26. Connecting member 26 can also include a second pair of rollers 95 (e.g., first roller 95a and second roller 95b) that are positioned at a lower end or lower portion of connecting member 26 and are similarly configured to engage, be received within, etc., the tracks, grooves, recesses, etc., of track 20.

Referring particularly to FIGS. 21 and 22, electric climb system 2000 includes an electric motor, shown as climb motor 2002, an output gear 2004, and a driven gear 2006. Output gear 2004 can be a spur gear, a helical gear, etc., that is rotatably fixedly coupled with an output driveshaft of climb motor 2002. Climb motor 2002 can operate to provide rotational kinetic energy to output gear 2004. Climb motor 2002 may drive output gear 2004 which meshes, engages, transfers rotational kinetic energy or torque, etc., to driven gear 2006. Output gear 2004 and driven gear 2006 may be configured to rotate about axes that are parallel with each other and spatially offset. Output gear 2004 may have a greater number of teeth and a greater diameter than driven gear 2006 so that an angular speed of driven gear 2006 is greater than an angular speed of output gear 2004. In this way, driven gear 2006 and output gear 2004 may form a gear train, a gear assembly, a gear sub-assembly, a drive train, etc., to transfer rotational kinetic energy or torque from climb motor 2002 to a pinion 2008.

Referring particularly to FIGS. 21-23, electric climb system 2000 includes pinion 2008 that is positioned between first lateral member 92a and second lateral member 92b. Pinion 2008 can be a spur gear, a cogged drum, a drive drum, a gear, a pinion, a rotational engagement member, engagement device, a rotatable climb member, etc., including one or more radial protrusions that are configured to engage, abut, contact, etc., corresponding rungs 98 of track 20. Rungs 98 of track 20 may extend between opposite frame members of track 20 that define recess 96a and recess 96b. In some embodiments, track 20 functions as a rack and pinion 2008 is driven by climb motor 2002 to drive grabber assembly 42 to ascend or descend along track 20.

Referring still to FIGS. 21-23, pinion 2008 can be positioned between first lateral member 92a and second lateral member 92b. For example, pinion 2008 can be rotatably fixedly coupled with an output shaft 2012 that extends between first lateral member 92a and second lateral member 92b of connecting member 26. Output shaft 2012 may be rotatably coupled at opposite ends with first lateral member 92a and second lateral member 92b through bearings 2010. In some embodiments, a first end of output shaft 2012 is rotatably fixedly coupled with driven gear 2006 so that rotational kinetic energy or torque is transferred from climb motor 2002, through an output driveshaft of climb motor 2002, through output gear 2004 and driven gear 2006, and to output shaft 2012 and pinion 2008. In this way, climb motor 2002 can rotate in a first direction so that pinion 2008 rotates to drive grabber assembly 42 to ascend or climb track 20, and in a second direction so that pinion 2008 rotates to drive grabber assembly 42 to descend track 20 (or so that grabber assembly descends track 20 at a controlled rate).

Referring particularly to FIG. 22, electric gripping motor system 1000 includes gripping motor 1002, output driveshaft 1004, output gear 1008, driven gear 1012, and an electric brake 1010. Electric gripping motor system 1000 also includes a medial or intermediate shaft assembly 1024 that is configured to deliver or transfer power provided by gripping motor 1002 to first grabber arm 44a and second grabber arm 44b to drive first grabber arm 44a and second grabber arm 44b to pivot about first axis 45a and second axis 45b, respectively (e.g., to grasp and/or release a container or refuse bin).

Gripping motor 1002 is configured to operate to generate or provide rotational kinetic energy or torque that is transferred through output driveshaft 1004. Output driveshaft 1004 may be rotatably coupled with connecting member 26 (e.g., first lateral member 92a) through a bearing 1006 so that output driveshaft 1004 is supported by connecting member 26 and can rotate relative to connecting member 26. In some embodiments, output driveshaft 1004 is configured to be selectively engaged by electric brake 1010. For example, electric brake 1010 can receive an electrical current or electrical power from a battery, power storage device, etc., of refuse vehicle 10 and operate to engage, lock, interface with, etc., output driveshaft 1004 so that output driveshaft 1004 is locked at a current angular position or to restrict or prevent rotation of output driveshaft 1004. In some embodiments, electric brake 1010 is transitionable between a first position (e.g., an unlocked position) so that rotation of output driveshaft 1004 is not limited (e.g., output driveshaft 1004 is freely driven by gripping motor 1002) and a second position (e.g., a locked position) so that rotation of output driveshaft 1004 is limited, prevented, restricted, etc. (e.g., so that output driveshaft 1004 is limited in its rotation or maintained at a current angular position or maintained within a specific angular range). Electric brake 1010 can transition between the first position and the second position in response to receiving a signal from the controller of refuse vehicle 10.

Output gear 1008 engages, meshes with, etc., driven gear 1012 and transfers rotational kinetic energy or torque to driven gear 1012. Output gear 1008 and driven gear 1012 can be spur gears, helical gears, etc., or any other types of gears. Driven gear 1012 may be rotatably fixedly coupled with a first shaft 1014a. In some embodiments, first shaft 1014a is rotatably coupled with connecting member 26 (e.g., first lateral member 92a) through a bearing 1016 so that first shaft 1014a can rotate relative to connecting member 26. First shaft 1014a includes a first end and a second end. The first end of first shaft 1014a can include screw threads, worm threads, a worm drive, etc., shown as first worm 1018a. First worm 1018a is configured to engage, mesh with, etc., a corresponding first worm gear 1020a that is rotatably fixedly coupled with first grabber arm shaft 1022a. First grabber arm shaft 1022a can be the same as or similar to first bushing 54a. In some embodiments, first grabber arm shaft 1022a is the same as or similar to adapter assembly pin 60a.

First grabber arm shaft 1022a may define axis 45a. In some embodiments, first grabber arm shaft 1022a is fixedly coupled at opposite ends with a first control arm 90a and a second control arm 90b of first grabber arm 44a (shown in FIGS. 20-22). First grabber arm shaft 1022a can be rotatably supported within a first housing or a first structural member 38a that is fixedly coupled with carriage 46 and/or connecting member 26. In some embodiments, first grabber arm shaft 1022a is rotatably coupled with first structural member 38a through one or more bearings.

In this way, gripping motor 1002 may be operated to drive first grabber arm 44a to rotate about axis 45a to grasp, grip, or otherwise removably couple with a container. Gripping motor 1002 outputs rotational kinetic energy or torque through output driveshaft 1004 which is transferred to output gear 1008. Output gear 1008 drives driven gear 1012 which is rotatably fixedly coupled with first shaft 1014a so that rotational kinetic energy is transferred through driven gear 1012 to first shaft 1014a. First shaft 1014a rotates to drive first worm gear 1020a, first grabber arm shaft 1022a, first control arm 90a, second control arm 90b, and first grabber arm 44a to rotate about axis 45a (e.g., to grasp and release a refuse container). Gripping motor 1002 can operate to drive output driveshaft 1004 in a first direction to drive first grabber arm 44a to rotate about axis 45a in a first direction (e.g., inwards, counter-clockwise, etc.) to grasp a container and can operate to drive output driveshaft 1004 in a second direction to drive first grabber arm 44a to rotate about axis 45a in a second or opposite direction (e.g., outwards, clockwise, etc.) to release a container.

In some embodiments, first shaft 1014a extends in a direction that is substantially orthogonal or perpendicular to axis 45a. First shaft 1014a can rotatably couple (e.g., fixedly) with intermediate shaft assembly 1024 through a first universal joint 1026a. Intermediate shaft assembly 1024 rotatably couples with first shaft 1014a through first universal joint 1026a at a first end of intermediate shaft assembly 1024, and rotatably couples with a second shaft 1014b through a second universal joint 1026b at a second, opposite, or distal end of intermediate shaft assembly 1024. Second universal joint 1026b can be the same as or similar to first universal joint 1026a and/or may be mirrored so that whatever is said of first universal joint 1026a may be said of second universal joint 1026b. Second shaft 1014b can be the same as or similar to first shaft 1014a so that whatever is said of first shaft 1014a may be said of second shaft 1014b and vice versa.

Second shaft 1014b includes a second worm 1018b that is the same as or similar to first worm 1018a. In some embodiments, second worm 1018b has a thread direction that is opposite a thread direction of first worm 1018a. Second worm 1018b is configured to engage, mesh with, etc., a second worm gear 1020b. Second worm gear 1020b can be the same as or similar to first worm gear 1020a. Second worm gear 1020b receives rotational kinetic energy or torque from second worm 1018b so that second worm gear 1020b rotates about axis 45b. Second worm gear 1020b is fixedly coupled with a second grabber arm shaft 1022b that is fixedly coupled with a first control arm 90a and second control arm 90b of second grabber arm 44b (e.g., at opposite ends of second grabber arm shaft 1022b). In this way, a single gripping motor 1002 can be used to drive both first grabber arm 44a and second grabber arm 44b to rotate about axis 45a and axis 45b, respectively. Specifically, intermediate shaft assembly 1024 facilitates providing rotational kinetic energy or torque for both first grabber arm 44a and second grabber arm 44b.

In some embodiments, first universal joint 1026a and second universal joint 1026b are optional. For example, intermediate shaft assembly 1024 may extend direction between first worm 1018a and second worm 1018b without first universal joint 1026a and second universal joint 1026b. In some embodiments, first worm 1018a and second worm 1018b are formed directly or integrally formed with opposite ends of intermediate shaft assembly 1024. First universal joint 1026a and second universal joint 1026b can facilitate accounting for any mis-alignment between first worm 1018a and second worm 1018b.

In other embodiments, electric gripping motor system 1000 includes a first gripping motor 1002 and a second gripping motor 1002. The first gripping motor 1002 can be configured to drive first grabber arm 44a to rotate about axis 45a as shown in FIG. 22 without intermediate shaft assembly 1024. The second gripping motor can be configured to independently drive second grabber arm 44b to rotate about axis 45b using a gear train similar to output driveshaft 1004, output gear 1008, driven gear 1012, first shaft 1014a, first worm 1018a, and first worm gear 1022a. In this way, a similar but mirrored gear train can be provided on an opposite side of grabber assembly 42 with its own gripping motor 1002 for independently driving second grabber arm 44b. The first gripping motor and second gripping motor can operate cooperatively to independently drive each of the first grabber arm 44a and the second grabber arm 44b to grasp and release refuse containers.

In some embodiments, first worm 1018a and second worm 1018b function to provide locking functionality or to reduce a likelihood that grabber arms 44 back-drive. For example, first worm 1018a and second worm 1018b may transfer rotational kinetic energy to first worm gear 1020a and second worm gear 1020b, respectively, to pivot grabber arms 44 about their respective axes 45, and prevent, restrict, limit, or reduce the likelihood that first worm 1018a and second worm 1018b are back driven by rotation of grabber arms 44 about their respective axes 45. In some embodiments, due to the anti-back driving characteristic of the engagement between worms 1018 and worm gears 1020, brake 1010 is optional.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire suppression system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

What is claimed is:

1. A refuse vehicle comprising:
   a chassis;
   a plurality of tractive elements coupled with the chassis and configured to support the refuse vehicle;
   a reach assembly coupled with the refuse vehicle; and
   a lift assembly coupled with the reach assembly, the lift assembly comprising:
     a track including a straight portion and a curved portion; and
     a fully-electric grabber assembly configured to ascend or descend the track, the fully-electric grabber assembly comprising:
       a carriage configured to movably couple with the track;
       a first grabber arm and a second grabber arm rotatably coupled with the carriage at opposite ends of the carriage; and
       an electric motor configured to drive one of the first grabber arm or the second grabber arm to rotate relative to the carriage;
       wherein the electric motor is configured to output torque through an output driveshaft and drive the first grabber arm to rotate relative to the carriage through a plurality of gears, wherein the plurality of gears comprise:
         a first gear rotatably coupled with the carriage and translationally fixedly coupled with the carriage at an axis radially offset from a center of the first gear and configured to receive the output torque from the output driveshaft to rotate about the axis;
         an intermediate gear configured to be driven by the first gear, wherein the intermediate gear is rotatably coupled with the first gear through a rotatable linkage that extends between the center of the first gear and a center of the intermediate gear; and
         an arm gear fixedly coupled with the first grabber arm and configured to be driven by the intermediate gear to pivot the first grabber arm.

2. The refuse vehicle of claim 1, wherein the plurality of gears form an eccentric gear train.

3. The refuse vehicle of claim 1, wherein the plurality of gears are configured to rotate about axes that are substantially parallel with an axis about which the first grabber arm rotates.

4. The refuse vehicle of claim 1, wherein the plurality of gears are a first plurality of gears, and the electric motor is a first electric motor, the fully-electric grabber assembly further comprising a second electric motor and a second plurality of gears configured to drive the second grabber arm to rotate relative to the carriage independently of operation of the first electric motor.

5. The refuse vehicle of claim 1, wherein the first gear and the intermediate gear have a same number of teeth.

6. The refuse vehicle of claim 1, wherein the arm gear comprises teeth along only a portion of an outer periphery.

7. A fully-electric grabber assembly for a refuse vehicle, the fully-electric grabber assembly comprising:
   a carriage configured to movably couple with a track of the refuse vehicle;
   a first grabber arm rotatably coupled with the carriage at a first end of the carriage;
   a second grabber arm rotatably coupled with the carriage at a second end of the carriage;
   an electric climb system comprising an electric climb motor configured to drive a pinion, the pinion configured to engage the track of the refuse vehicle to move the fully-electric grabber assembly along the track; and
   an electric gripping system comprising:
     an electric motor;
     an eccentric gear train comprising a plurality of gears configured to be driven by the electric motor and drive one of the first grabber arm or the second grabber arm to rotate relative to the carriage, wherein the plurality of gears comprise:
       a first gear rotatably coupled with the carriage and translationally fixedly coupled with the carriage at an axis radially offset from a center of the first gear and configured to receive output torque from an output driveshaft of the electric motor to rotate about the axis;
       an intermediate gear configured to be driven by the first gear, wherein the intermediate gear is rotatably coupled with the first gear through a rotatable linkage that extends between the center of the first gear and a center of the intermediate gear; and
       an arm gear fixedly coupled with the first grabber arm and configured to be driven by the intermediate gear to pivot the first grabber arm.

8. The fully-electric grabber assembly of claim 7, wherein the plurality of gears of the eccentric gear train are configured to rotate about axes that are substantially parallel with an axis about which the first grabber arm rotates.

9. The fully-electric grabber assembly of claim 7, wherein the eccentric gear train is a first eccentric gear train, and the electric motor is a first electric motor, the fully-electric grabber assembly further comprising a second electric motor and a second eccentric gear train configured to drive the second grabber arm to rotate relative to the carriage independently of operation of the first electric motor.

10. The fully-electric grabber assembly of claim 7, wherein the first gear and the intermediate gear have a same number of teeth.

11. The fully-electric grabber assembly of claim 7, wherein the arm gear comprises teeth along only a portion of an outer periphery.

12. The fully-electric grabber assembly of claim 7, wherein the arm gear is configured to rotate about an axis about which the first grabber arm rotates.

13. The fully-electric grabber assembly of claim 7, wherein the eccentric gear train is positioned at least partly within an inner volume of the carriage.

14. A fully-electric grabber assembly comprising:
    a carriage;
    a grabber arm pivotally coupled at an end of the carriage;
    an electric motor configured to drive an output driveshaft;
    a first gear rotatably coupled with the carriage at an axis radially offset from a center of the first gear, the first gear configured to be driven by the output driveshaft to rotate about the axis;
    an intermediate gear configured to be driven by the first gear, wherein the intermediate gear is rotatably coupled with the first gear through a rotatable linkage that extends between the center of the first gear and a center of the intermediate gear; and an arm gear fixedly coupled with the grabber arm and configured to be driven by the intermediate gear to pivot the grabber arm.

15. The fully-electric grabber assembly of claim 14, wherein the first gear, the intermediate gear, and the arm gear form an eccentric gearing system.

16. The fully-electric grabber assembly of claim 14, wherein the first gear and the intermediate gear have a same number of teeth.

17. The fully-electric grabber assembly of claim 14, wherein the arm gear comprises teeth along only a portion of an outer periphery.

\* \* \* \* \*